(12) United States Patent
Yoshioka et al.

(10) Patent No.: US 7,770,406 B2
(45) Date of Patent: Aug. 10, 2010

(54) REFRIGERATOR

(75) Inventors: Takahiro Yoshioka, Osaka (JP); Hidetake Hayashi, Osaka (JP); Minoru Temmyo, Osaka (JP)

(73) Assignees: Kabushiki Kaisha Toshiba, Tokyo (JP); Toshiba Consumer Marketing Corporation, Tokyo (JP); Toshiba HA Products Co., Ltd., Ibaraki-shi (JP)

( * ) Notice: Subject to any disclaimer, the term of this patent is extended or adjusted under 35 U.S.C. 154(b) by 1030 days.

(21) Appl. No.: 10/580,835

(22) PCT Filed: Nov. 22, 2004

(86) PCT No.: PCT/JP2004/017664

§ 371 (c)(1),
(2), (4) Date: Aug. 15, 2006

(87) PCT Pub. No.: WO2005/052468

PCT Pub. Date: Jun. 9, 2005

(65) Prior Publication Data

US 2008/0190125 A1 Aug. 14, 2008

(30) Foreign Application Priority Data

Nov. 28, 2003 (JP) ............................ 2003-400681
Jan. 29, 2004 (JP) ............................ 2004-021559
Jan. 29, 2004 (JP) ............................ 2004-021560

(51) Int. Cl.
*F25B 17/02* (2006.01)
*F25B 41/00* (2006.01)

(52) U.S. Cl. ............................ 62/199; 62/212; 62/217; 62/510

(58) Field of Classification Search .................. 62/175, 62/199, 200, 208, 210, 212, 217, 504, 510
See application file for complete search history.

(56) References Cited

U.S. PATENT DOCUMENTS 6,370,895 B1 * 4/2002 Sakuma et al. ................ 62/199
6,460,357 B1 * 10/2002 Doi et al. ...................... 62/199

(Continued)

FOREIGN PATENT DOCUMENTS

EP   0 541 324 A1   5/1993

(Continued)

*Primary Examiner*—Marc E Norman
(74) *Attorney, Agent, or Firm*—Oblon, Spivak, McClelland, Maier & Neustadt, L.L.P.

(57) ABSTRACT

A high-pressure side discharge port of a two-stage compressor (12A) and a condenser (14A) are connected, condenser (14A) and a PMV (15A) are connected, a refrigerating side exit of PMV (15A) is connected to a medium pressure side suction port of two-stage compressor (12A) via an R capillary tube (16A) and an F evaporator (18A), connected to an F evaporator (26A) via an F capillary tube (24A), F evaporator (26A) is connected to a low-pressure side suction port of two stage compressor (12A) via a low-pressure suction pipe (28A), PMV (15A) can switch a simultaneous cooling mode and a freezing mode, and in the simultaneous cooling mode, a refrigerant flow rate toward R evaporator (18A) is adjusted by PMV (15A), and thereby a temperature difference control is performed so as to make a difference between an entrance temperature and an exit temperature of R evaporator (18A) equal to a preset temperature difference (for example, 4° C.).

14 Claims, 25 Drawing Sheets

U.S. PATENT DOCUMENTS

| | | | |
|---|---|---|---|
| 6,931,870 B2 * | 8/2005 | Kim et al. | 62/198 |
| 7,448,226 B2 * | 11/2008 | Yamashita et al. | 62/259.2 |
| 7,475,557 B2 * | 1/2009 | Yoshioka et al. | 62/175 |
| 2005/0132733 A1 * | 6/2005 | Rafalovich et al. | 62/199 |

FOREIGN PATENT DOCUMENTS

| | | |
|---|---|---|
| EP | 1 182 410 A2 | 2/2002 |
| JP | 4 297757 | 10/1992 |
| JP | 2001 201235 | 7/2001 |
| JP | 2001 280786 | 10/2001 |
| JP | 2001 343076 | 12/2001 |
| JP | 2002 61972 | 2/2002 |
| JP | 2003 106693 | 4/2003 |
| JP | 2003-106693 | 4/2003 |
| JP | 2003-287333 | 10/2003 |

* cited by examiner

| MODE | | STOPPED | FREEZING MODE | SIMULTANEOUS COOLING MODE |
|---|---|---|---|---|
| PMV PULSE POSITION | 13 PULSES | 37 PULSES | 61 PULSES | 70 TO 81 PULSES |
| FREEZING SIDE EXIT | FULLY CLOSED | FULLY CLOSED | FULLY OPENED | FULLY OPENED |
| REFRIGERATING SIDE EXIT | FULLY OPENED | FULLY CLOSED | FULLY CLOSED | FLOW RATE CONTROL |

Fig. 12
(a) 4 - PULSE POSITION
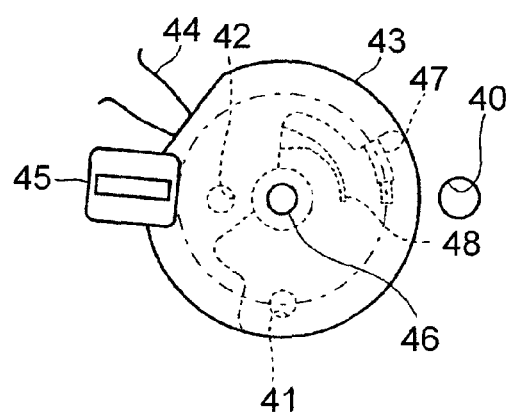
(b) 20 - PULSE POSITION
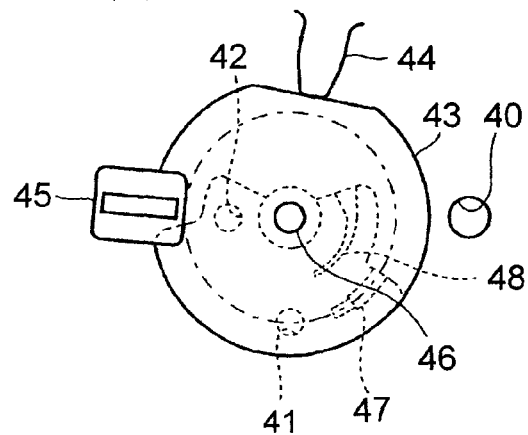
(c) 29 - PULSE POSITION
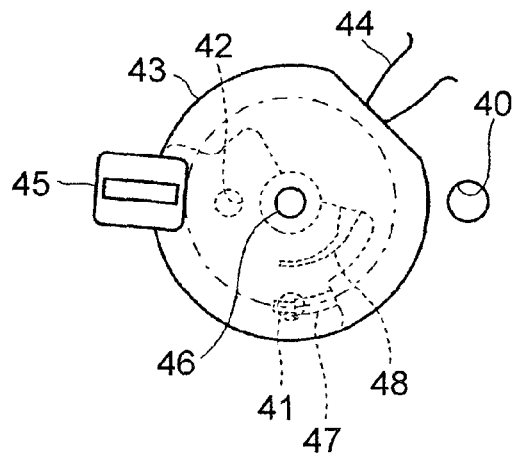
(d) 41 - PULSE POSITION
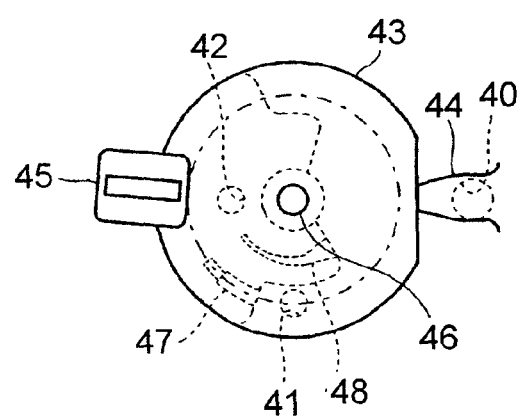

Fig. 12(CONTINUED)
(e) 49-PULSE POSITION
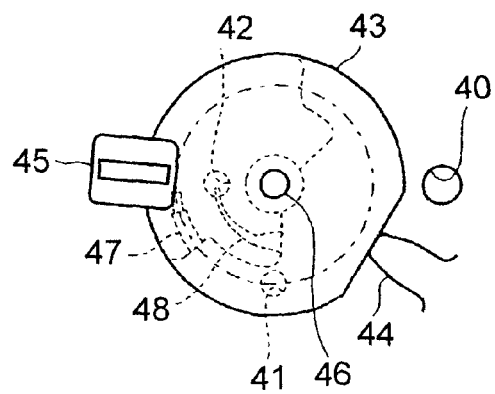
(f) 62-PULSE POSITION
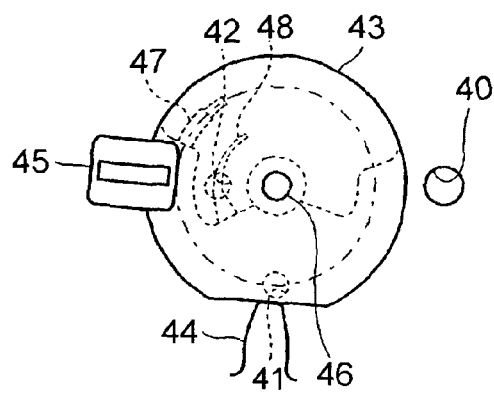
(g) 71-PULSE POSITION
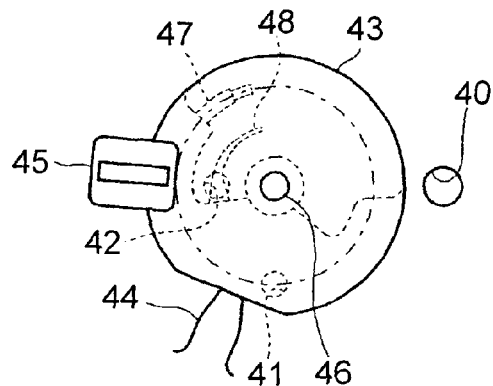
(h) 82-PULSE POSITION
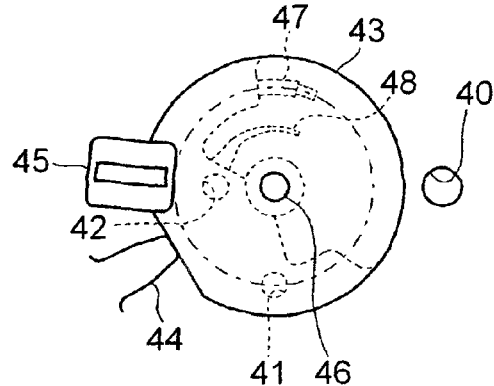

(a)   (b)

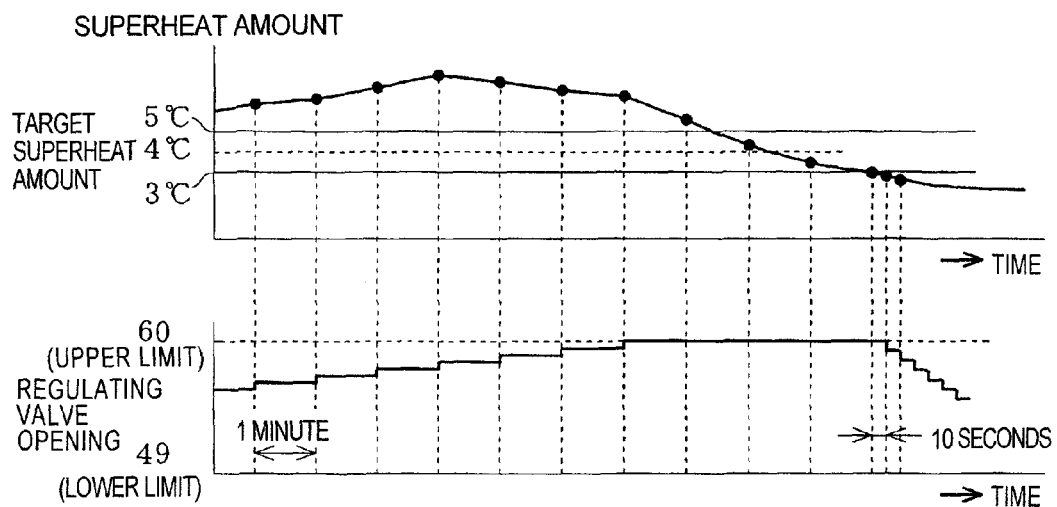

REFRIGERATOR

TECHNICAL FIELD

The present invention relates to a refrigerator of a type of supplying a refrigerant to an evaporator for a freezing chamber and an evaporator for a refrigerating chamber.

BACKGROUND ART

Conventionally, as a refrigerator having a freezing cycle of sending a refrigerant to two evaporators using a two-stage compressor, the following is proposed.

Namely, a refrigerator with an on-off valve installed at an exit of a condenser is proposed, which by switching the on-off valve, executes a simultaneous cooling mode for supplying a refrigerant sequentially to a refrigerating evaporator (hereinafter referred to as an R evaporator) and a freezing evaporator (hereinafter referred to as an F evaporator), and thereby for simultaneously cooling the R evaporator and the F evaporator, or executes a cooling mode for supplying a refrigerant only to a freezing evaporator (hereinafter referred to as an F evaporator) via a bypass tube from the on-off valve (for example, refer to Patent Document 1).

[Patent Document 1] Japanese Patent Disclosure (Kokai) 2002-31459

In the refrigerator aforementioned, in the simultaneous cooling mode for simultaneously cooling the refrigerating chamber and freezing chamber, the evaporation temperature of the R evaporator and the evaporation temperature of the F evaporator are the same, thus a problem arises that the efficiency of the freezing cycle cannot be improved.

Further, the absolute value of the evaporation temperature of the R evaporator is low, so that a problem arises that the relative humidity in the refrigerating chamber is low.

Furthermore, the on-off valve is switched when it is necessary to cool each of the freezing chamber and the refrigerating chamber, so that a loss is caused in the on-off valve and the temperature of either of the chambers rises during the waiting time in the alternate cooling, and thus a problem arises that the temperature cannot be set finely and a higher constant temperature performance cannot be obtained.

A refrigerator in wide use as a domestic article generally has a section of a freezing temperature zone and a section of a refrigerating temperature zone, and in a refrigerator of a type of cooling inside the refrigerator by one evaporator, a distribution of cooled air to the freezing section and the refrigerating section is controlled by a damper, and according to the overall load, a compressor is controlled for on and off. Further, in a type of controlling a number of revolutions of the compressor by an inverter, the number of the revolutions is further controlled finely. In the refrigerator having such a constitution, a refrigerant is evaporated so as to make the exit temperature of the evaporator equal to the temperature of the cooling section.

Furthermore, in recent years, as a type having a freezing evaporator and a refrigerating evaporator respectively in a freezing section and a refrigerating section, there is a refrigerator in which the refrigerating evaporator and the freezing evaporator are connected in series. This refrigerator can simultaneously cool the two sections of the freezing section and the refrigerating section, though a suction pressure of the compressor is restricted by a pressure of the freezing evaporator having a low evaporation temperature, so that it is difficult to enhance the efficiency of the freezing cycle.

On the other hand, in a refrigerator in which a freezing evaporator and a refrigerating evaporator are connected in parallel and are cooled alternately, a check valve is added and it is controlled so as to increase the evaporation temperature of the refrigerating evaporator for cooling the refrigerating chamber, thus the efficiency of the freezing cycle can be enhanced, though the sections of the two temperature zones cannot be cooled simultaneously.

[Patent Document 2] Japanese Patent Disclosure (Kokai) 2001-12634

[Patent Document 3] Japanese Patent Disclosure (Kokai) 2002-147896

[Patent Document 4] Japanese Patent Disclosure (Kokai) 2001-278934

In the constitution that a freezing evaporator and a refrigerating evaporator are connected in parallel, a refrigerator is considered, which is provided with a refrigerant flow rate adjustment device for distributing a refrigerant supplied to the two evaporators from the condenser and for adjusting the refrigerant flow rate, and simultaneously supplies the refrigerant to the freezing evaporator and refrigerating evaporator and simultaneously cools the sections of the two temperature zones.

In such a constitution, the refrigerant is distributed to the freezing evaporator and refrigerating evaporator by the flow rate resistance of capillary tubes connecting the condenser and evaporators, and it is difficult to control the refrigerant flow rate flowing through the capillary tubes depending on the condition of each evaporator, so that the cooling capacity of each evaporator cannot be controlled.

Therefore, the applicant considers developing an adjustment valve for adjusting the refrigerant flow ratio (rate to the maximum flow) to the freezing evaporator and the refrigerating evaporator according to the opening of the valve body and to limit and adjust the refrigerant flow rate to one evaporator according to the opening of the valve body. Namely, for example, it is to limit and adjust the refrigerant flow rate to the refrigerating evaporator (the refrigerant flow rate to the freezing evaporator is maximum), thereby to realize a simultaneous supply of the refrigerant to the freezing evaporator and refrigerating evaporator.

However, an appropriate refrigerant amount to the evaporators is always varied according to the operating condition of the refrigerator, so that even if the refrigerant flow rate to one evaporator is limited and adjusted, there is no method available for correctly judging whether the refrigerant flow rate to one evaporator is appropriate or not, and a problem is left unsolved that the flow rate adjustment cannot be executed appropriately.

Therefore, it is considered to install temperature sensors for detecting an entrance temperature and an exit temperature of one evaporator, to obtain a superheat amount (the difference between the exit temperature and the entrance temperature) of one evaporator from the temperature sensors, and to control appropriately the superheat amount, though when the accuracy of the temperature sensors is low, the control on the basis of such a superheat amount is difficult.

Further, as a result of limiting and adjusting the refrigerant flow rate to one evaporator, when the supply of the refrigerant to one evaporator is stopped or the refrigerant flow rate is limited to a minimum refrigerant flow ratio, even if the refrigerant is next supplied to one evaporator, a delay is caused under the ordinary control until a sufficient refrigerant is supplied to one evaporator, and there is a fear that obstacles may be caused in limiting and adjusting one evaporator.

The present invention, with the foregoing problems in view, provides a refrigerator having a two-stage compressor for efficiently cooling both a refrigerating chamber and a freezing chamber.

Further, the present invention was developed with the foregoing in view, and is intended to provide a refrigerator of a type of supplying a refrigerant to an evaporator for a freezing chamber and an evaporator for a refrigerating chamber, wherein when, on the basis of a superheat amount which is a difference between an exit temperature of one evaporator and an entrance temperature thereof, limiting and adjusting a refrigerant flow rate to one evaporator according to an opening of a valve body so as to make the superheat amount of one evaporator appropriate, the entrance temperature of one evaporator and the exit temperature thereof can be detected accurately.

Furthermore, the present invention was developed with the foregoing in view, and is intended to provide a refrigerator of a type of supplying a refrigerant to an evaporator for a freezing chamber and an evaporator for a refrigerating chamber, wherein when limiting and adjusting a refrigerant flow rate to one evaporator according to an opening of a valve body, no delay is caused to refrigerant supply to one evaporator.

DISCLOSURE OF INVENTION

An invention relating to Claim 1 is a refrigerator having a freezing cycle, wherein: a high-pressure side discharge port of a two-stage compressor and a condenser are connected; said condenser and flow rate variable means of a cross valve type are connected; a refrigerating side exit of said flow rate variable means is connected to a medium pressure side suction port of said two-stage compressor via a refrigerating capillary tube and an evaporator for a refrigerating chamber; a freezing side exit of said flow rate variable means is connected to an evaporator for a freezing chamber via a freezing capillary tube; and said evaporator for said freezing chamber is connected to a low-pressure side suction port of said two-stage compressor via a low-pressure suction pipe; characterized in that said refrigerator further comprises control means, which: switches a simultaneous cooling mode for simultaneously supplying a refrigerant to said evaporator for said refrigerating chamber and said evaporator for said freezing chamber and a freezing mode for supplying said refrigerant only to said evaporator for said freezing chamber to each other by said flow rate variable means; and during said simultaneous cooling mode, adjusts a refrigerant flow rate in a direction of easy flow of said refrigerant in either of said refrigerating capillary tube and said freezing capillary tube by said flow rate variable means, and thereby performs a temperature difference control so as to make a difference between an entrance temperature of said evaporator in said direction of easy flow of said refrigerant and an exit temperature thereof equal to a preset temperature difference.

An invention relating to Claim 2 is a refrigerator having a freezing cycle, wherein: a high-pressure side discharge port of a two-stage compressor and a condenser are connected; said condenser and flow rate variable means of a cross valve type are connected; a refrigerating side exit of said flow rate variable means is connected to a medium pressure side suction port of said two-stage compressor via a refrigerating capillary tube and an evaporator for a refrigerating chamber; a freezing side exit of said flow rate variable means is connected to an evaporator for a freezing chamber via a freezing capillary tube; and said evaporator for said freezing chamber is connected to a low-pressure side suction port of said two-stage compressor via a low-pressure suction pipe; characterized in that said refrigerator further comprises control means, which: switches a simultaneous cooling mode for simultaneously supplying a refrigerant to said evaporator for said refrigerating chamber and said evaporator for said freezing chamber and a freezing mode for supplying said refrigerant only to said evaporator for said freezing chamber to each other by said flow rate variable means; and during said simultaneous cooling mode, adjusts a refrigerant flow rate in a direction of easy flow of said refrigerant in either of said refrigerating capillary tube and said freezing capillary tube by a number of revolutions of a fan in the neighborhood of said evaporator installed in said direction of easy flow of said refrigerant, and thereby performs a temperature difference control so as to make a difference between an entrance temperature of said evaporator in said direction of easy flow of said refrigerant and an exit temperature thereof equal to a preset temperature difference.

An invention relating to Claim 3 is a refrigerator having a freezing cycle, wherein: a high-pressure side discharge port of a two-stage compressor and a condenser are connected; said condenser and flow rate variable means of a cross valve type are connected; a refrigerating side exit of said flow rate variable means is connected to a medium pressure side suction port of said two-stage compressor via a refrigerating capillary tube and an evaporator for a refrigerating chamber; a freezing side exit of said flow rate variable means is connected to an evaporator for a freezing chamber via a freezing capillary tube; and said evaporator for said freezing chamber is connected to a low-pressure side suction port of said two-stage compressor via a low-pressure suction pipe; characterized in that said refrigerator farther comprises control means, which: switches a simultaneous cooling mode for simultaneously supplying a refrigerant to said evaporator for said refrigerating chamber and said evaporator for said freezing chamber and a freezing mode for supplying said refrigerant only to said evaporator for said freezing chamber to each other by said flow rate variable means; and during said simultaneous cooling mode, adjusts a refrigerant flow rate in a direction of easy flow of said refrigerant in either of said refrigerating capillary tube and said freezing capillary tube by said flow rate variable means or by a number of revolutions of a fan in the neighborhood of said evaporator installed in said direction of easy flow of said refrigerant, and thereby performs a temperature difference control so as to make a difference between an entrance temperature of said evaporator in said direction of easy flow of said refrigerant and an exit temperature thereof equal to a preset temperature difference.

An invention relating to Claim 4 is the refrigerator according to at least one of Claims 1 to 3, wherein: said refrigerant flows in said refrigerating capillary tube easier than said freezing capillary tube.

An invention relating to Claim 5 is the refrigerator according to at least one of Claims 1 to 3, further comprising: an accumulator installed on a downstream side of said evaporator in a direction of hard flow of said refrigerant in either of said refrigerating capillary tube and said freezing capillary tube.

An invention relating to Claim 6 is the refrigerator according to at least one of Claims 1 to 3, further comprising: temperature sensors installed respectively at an entrance and an exit of said evaporator in said direction of easy flow of said refrigerant; and wherein said control means measures said entrance temperature and said exit temperature using said both temperature sensors.

An invention relating to Claim 7 is the refrigerator according to at least one of Claims 1 to 3, wherein: said control means, in said freezing mode, adjusts a capacity of said two-stage compressor, and thereby controls said temperature of said evaporator for said freezing chamber.

An invention relating to Claim 8 is the refrigerator according to at least one of Claims 1 to 3, wherein: said control means performs said temperature difference control a fixed period of time after starting said simultaneous cooling mode.

An invention relating to Claim 9 is the refrigerator according to at least one of Claims 1 to 3, wherein: said control means, at a start time of said temperature difference control, opens fully said refrigerating side exit of said flow rate adjustment means and at an end time of said simultaneous cooling mode, closes it fully.

An invention relating to Claim 10 is the refrigerator according to Claim 2, wherein: said control means rotates said fan at a low speed when a difference between said entrance temperature and said exit temperature is higher than a predetermined temperature difference and at a high speed when said difference is lower than said predetermined temperature difference.

An invention relating to Claim 11 is the refrigerator according to Claim 3, wherein: said control means adjusts said number of revolutions of said fan together with said flow rate adjustment by said flow rate adjustment means.

An invention relating to Claim 12 is the refrigerator according to Claim 3, wherein: said control means, when a flow rate of said refrigerant at said exit of said flow rate adjustment means in said direction of easy flow of said refrigerant is lower than a predetermined flow rate, makes said number of revolutions of said fan larger than a predetermined number of revolutions.

An invention relating to Claim 13 is the refrigerator according to Claim 3, wherein said control means, when a flow rate of said refrigerant at said exit of said flow rate adjustment means in said direction of easy flow of said refrigerant is higher than a predetermined flow rate, makes said number of revolutions of said fan smaller than a predetermined number of revolutions.

An invention relating to Claim 14 is the refrigerator according to Claim 3, wherein: said control means, when a difference between said entrance temperature and said exit temperature is higher than a predetermined temperature difference, adjusts said flow rate by said flow rate variable means, and when said temperature difference is lower than said predetermined temperature difference, adjusts said flow rate by said fan, and thereby performs said temperature difference control.

A refrigerator of this invention, comprising: a condenser for liquefying a gas refrigerant discharged from a compressor; refrigerant flow rate adjustment means with two valve openings for discharging said refrigerant flowing in from said condenser and for adjusting refrigerant flow rates flowing out through said valve openings as flow ratios to said refrigerant flow rates when said valve openings are opened fully according to an opening of a valve body; a freezing evaporator and a refrigerating evaporator in which said refrigerants flowing out from said valve openings of said refrigerant flow rate adjustment means flow, respectively; temperature sensors for detecting an entrance temperature and an exit temperature of one evaporator; and control means for executing a freezing cycle operation on the basis of cooled conditions of a freezing section and a refrigerating section cooled by said freezing evaporator and said refrigerating evaporator, respectively; wherein said control means controls said refrigerant flow rate adjustment means to limit and adjust said refrigerant flow rate to at least one evaporator so as to make a superheat amount which is a difference between said exit temperature and said entrance temperature of said one evaporator detected by said temperature sensors equal to a target superheat amount, when a predetermined condition for regarding said entrance temperature and said exit temperature of said one evaporator as the same is held, calibrates said detected temperatures by said temperature sensor so as to be the same, and then returns to an ordinary control. (Claim 15)

In the construction aforementioned, said control means, when a power source is turned on, may judge that said predetermined condition is held. (Claim 16)

A refrigerator of this invention, comprising: a condenser for liquefying a gas refrigerant discharged from a compressor; refrigerant flow rate adjustment means with two valve openings for discharging said refrigerant flowing in from said condenser and for adjusting refrigerant flow rates flowing out through said valve openings as flow ratios to full openings; a freezing evaporator and a refrigerating evaporator in which said refrigerants flowing out from said valve openings of said refrigerant flow rate adjustment means flow, respectively; a temperature sensor for detecting an exit temperature of one evaporator; and control means for executing a freezing cycle operation on the basis of cooled conditions of a freezing section and a refrigerating section cooled by said freezing evaporator and said refrigerating evaporator, and for executing a defrosting operation on the basis of a temperature detected by said temperature sensor, respectively; wherein said control means controls said refrigerant flow rate adjustment means to limit and adjust said refrigerant flow rate to at least one evaporator, and when a state continues that said temperature detected by said temperature sensor is constant during said defrosting operation for said one evaporator calibrates said detected temperature to be zero. (Claim 17)

A refrigerator of this invention, comprising: a condenser for liquefying a gas refrigerant discharged from a compressor; refrigerant flow rate adjustment means with two valve openings for discharging said refrigerant flowing in from said condenser and for adjusting refrigerant flow rates flowing out through said valve openings as flow ratios to said refrigerant flow rates when said valve openings are opened fully according to an opening of a valve body; a freezing evaporator and a refrigerating evaporator in which said refrigerants flowing out from said valve openings of said refrigerant flow rate adjustment means flow, respectively; and control means for executing a freezing cycle operation on the basis of cooled conditions of a freezing section and a refrigerating section cooled by said freezing evaporator and said refrigerating evaporator, respectively; wherein said control means controls said refrigerant flow rate adjustment means to limit and adjust said refrigerant flow rate to at least one evaporator, and when a predetermined condition for regarding that a stop state of a refrigerant supply to said one evaporator occurs is held, controls said refrigerant flow ratio to said one evaporator to a predetermined return value. (Claim 18)

In the construction aforementioned, said control means, when controlling said refrigerant flow rate adjustment means such that said valve opening to said one evaporator is closed fully or is put into a minimum opening state, judges that said predetermined condition is held. (Claim 19)

Furthermore, a temperature sensor for detecting an exit temperature of said one evaporator is provided; and said control means, when a rise rate of said temperature detected by said temperature sensor is higher than a predetermined value, judges that said predetermined condition is held. (Claim 20)

Furthermore, temperature sensors for detecting an entrance temperature and an exit temperature of said one evaporator are provided; and said control means, when a difference between said exit temperature and said entrance temperature of said one evaporator detected by said temperature sensors is lower than a predetermined value and a difference between said entrance temperature of said one evaporator and a temperature of a section to be cooled of said one evaporator is lower than a predetermined value, judges that said predetermined condition is held. (Claim 21)

Furthermore, said control means, in a state that said control means judges that said predetermined condition is held and controls said refrigerant flow ratio to said one evaporator to said return value, controls said refrigerant flow rate adjustment means to set a next return value so as to be small when judging that said refrigerant flow rate to said one evaporator is insufficient and to set said next return value so as to be large when judging that said refrigerant flow rate is excessive. (Claim 22)

Furthermore, said control means, when a number of revolutions of said compressor is large, changes said return value high. (Claim 23)

Furthermore, said control means, when an air temperature is low, does not change said return value. (Claim 24)

In the refrigerator of the present invention relating to Claim 1, in a simultaneous cooling mode, the refrigerant flow rate in the direction of easy flow of the refrigerant is adjusted by the flow rate variable means, thus the temperature difference control is performed so as to make the difference between the entrance temperature of the evaporator in the direction of the easy flow of the refrigerant and the exit temperature thereof equal to the set temperature difference. By doing this, in the evaporator in the direction of the easy flow of the refrigerant, a liquid refrigerant evaporates to a gas refrigerant, and no liquid back is caused in the two-stage compressor. Further, the liquid refrigerant evaporates, thus the evaporator can be cooled surely.

In the refrigerator of the present invention relating to Claim 2, the refrigerant flow rate in the direction of the easy flow of the refrigerant is adjusted by the number of revolutions of the fan in the neighborhood of the evaporator installed in the direction of the easy flow of the refrigerant, thus the temperature difference control is performed so as to make the difference between the entrance temperature of the evaporator in the direction of the easy flow of the refrigerant and the exit temperature thereof equal to the set temperature difference. By doing this, in the evaporator in the direction of the easy flow of the refrigerant, a liquid refrigerant evaporates to a gas refrigerant, and no liquid back is caused in the two-stage compressor. Further, the liquid refrigerant evaporates, thus the evaporator can be cooled surely.

In the refrigerator of the present invention relating to Claim 3, the refrigerant flow rate in the direction of the easy flow of the refrigerant is adjusted by the flow rate variable means or by the number of revolutions of the fan in the neighborhood of the evaporator installed in the direction of the easy flow of the refrigerant, thus the temperature difference control is performed so as to make the difference between the entrance temperature of the evaporator in the direction of the easy flow of the refrigerant and the exit temperature thereof equal to the set temperature difference. By doing this, in the evaporator in the direction of the easy flow of the refrigerant, a liquid refrigerant evaporates to a gas refrigerant, and no liquid back is caused in the two-stage compressor. Further, the liquid refrigerant evaporates, thus the evaporator can be cooled surely.

In the refrigerator of the present invention relating to Claim 4, it is constituted that the refrigerant flows easier in the refrigerating capillary tube than in the cooling capillary tube, and thus the temperature of the refrigerating evaporator is controlled by the adjustment of the refrigerant flow rate. By doing this, the temperature of the refrigerating evaporator can be controlled surely. Further, no liquid back is caused to the suction port of the two-stage compressor on the intermediate pressure side from the refrigerating evaporator.

In the refrigerator of the present invention relating to Claim 5, on the downstream side of the evaporator in the direction of the uneasy flow, the accumulator is installed, thus from the evaporator in the direction of the uneasy flow of the refrigerant, no liquid back is caused to the two-stage compressor.

In the refrigerator of the present invention relating to Claim 6, temperature sensors are installed respectively at the entrance and the exit of the evaporator in the direction of the easy flow of the refrigerant, and thus its entrance temperature and its exit temperature can be measured surely.

In the refrigerator of the present invention relating to Claim 7, in the freezing mode, the capacity of the two-stage compressor is adjusted, and the temperature of the evaporator for the freezing chamber is controlled, and thus the temperature of the evaporator for the freezing chamber can be controlled accurately.

In the refrigerator of the present invention relating to Claim 8, the fixed period of time after the start of the simultaneous cooling mode, the temperature difference control is performed, so that after the freezing mode is switched to the simultaneous cooling mode or after the refrigerator is started and the simultaneous cooling mode is started, and the condition is stabilized, the temperature difference control can be performed.

In the refrigerator of the present invention relating to Claim 9, at the start time of the temperature difference control, the exit on the refrigerant side of the flow rate adjustment means is opened fully, thus the temperature difference control can be performed surely.

In the refrigerator of the present invention relating to Claim 10, when the difference between the entrance temperature and the exit temperature is higher than the predetermined temperature difference, the fan rotates at the low speed and when it is lower than the predetermined temperature difference, the fan rotates at the high speed, thus the refrigerant amount can be controlled appropriately, and the evaporation of the refrigerant in the evaporator in the direction of the easy flow of the refrigerant can be performed surely. Namely, when the temperature difference is higher than the predetermined temperature difference, the fan rotates at the low speed to suppress the evaporation of the liquid refrigerant and when it is lower than the predetermined temperature difference, the fan rotates at the high speed to promote the evaporation of the liquid refrigerant.

In the refrigerator of the present invention relating to Claim 11, the number of revolutions of the fan is adjusted together with the flow rate adjustment by the flow rate adjustment means, thus the temperature difference control can be performed accurately.

In the refrigerator of the present invention relating to Claim 12, when the refrigerant flow rate at the exit of the flow rate adjustment means in the direction of the easy flow of the refrigerant is lower than the predetermined flow rate, the number of revolutions of the fan is made larger than the predetermined number of revolutions so as to promote the evaporation of the liquid refrigerant. By doing this, the evaporation of the liquid refrigerant inside the evaporator in the direction of the easy flow of the refrigerant can be performed surely.

In the refrigerator of the present invention relating to Claim 13, when the refrigerant flow rate at the exit of the flow rate adjustment means in the direction of the easy flow of the refrigerant is higher than the predetermined flow rate, the number of revolutions of the fan is made smaller than the predetermined number of revolutions so as to suppress the evaporation of the liquid refrigerant. By doing this, the evaporation of the liquid refrigerant inside the evaporator in the direction of the easy flow of the refrigerant can be performed surely, and the cooling of the evaporator can be performed surely.

In the refrigerator of the present invention relating to Claim 14, when the difference between the entrance temperature and the exit temperature is higher than the predetermined temperature difference, both temperatures are adjusted by the flow rate variable means to control such that the temperature difference becomes equal to the preset temperature difference, and when the temperature difference is lower than the predetermined temperature difference, both temperatures are adjusted by the fan to perform the temperature difference control, thus the temperature difference can be surely controlled to the preset temperature difference.

According to the invention stated in Claim 15, when adjusting the refrigerant flow rate to one evaporator so as to control the superheat amount of one evaporator to the target superheat amount, if the predetermined condition for regarding the entrance temperature of one evaporator and the exit temperature thereof as the same is held, the temperatures detected by the temperature sensors for detecting the temperatures should be the same, so that the temperatures detected by the temperature sensors are calibrated so as to be the same, thus the reliability of the subsequent control by the temperature sensors can be enhanced.

According to the invention stated in Claim 16, until the refrigerator is delivered from the factory and the power is turned on, the temperatures of the evaporators are the same positive temperature. Therefore, when the power is turned on, the entrance temperature of one evaporator and the exit temperature thereof are the same, so that at that time, the entrance temperature and exit temperature detected by the temperature sensors are calibrated so as to be the same, thus the reliability of the subsequent control by the temperature sensors can be enhanced.

According to the invention stated in Claim 17, during thawing of the frost attached to each evaporator by the defrosting operation, the exit temperature of the evaporator is kept in the 0° C. state, so that when such the state is set during the execution of the defrosting operation, the detected temperatures by the temperature sensors are calibrated so as to be 0° C., thus the subsequent defrosting operation can be performed surely.

When the refrigerant supply to one evaporator is stopped, the refrigerant amount to one evaporator becomes insufficient, and even if the refrigerant is supplied under the ordinary control, a certain period of time is required to cancel the insufficient state of the refrigerant amount to one evaporator. Though, according to the invention stated in Claim 18, when the predetermined condition for considering that the refrigerant supply to one evaporator is stopped is held, the refrigerant flow ratio to one evaporator is controlled to the predetermined return value, thus the sufficient amount of refrigerant is supplied to one evaporator at a stroke to rapidly cool it.

According to the invention stated in Claim 19, the control means can judge according to the control result by itself that the refrigerant supply to one evaporator is stopped, so that it can be executed easily without using a special means.

According to the invention stated in Claim 20, when the refrigerant supply to one evaporator is stopped, the rising rate of the exit temperature of one evaporator is higher than usual, so that by detecting it, it can be detected surely that the refrigerant supply to one evaporator is stopped.

According to the invention stated in Claim 21, when the refrigerant supply to one evaporator is stopped, as with the exit temperature of one evaporator rises the entrance temperature also rises, and further the difference between the entrance temperature of one evaporator and the temperature of the section to be cooled of one evaporator is lower than the predetermined value, so that by detecting it, it can be detected surely that the refrigerant supply to one evaporator is stopped.

When it is judged that the refrigerant flow rate to one evaporator is insufficient, the refrigerant flow ratio to one evaporator is controlled to the predetermined return value, thus one evaporator can be cooled rapidly, though there may be a case that the refrigerant flow rate in the control state to the return value is not appropriate.

Therefore, according to the invention stated in Claim 22, the next return value is set according to the too high or low refrigerant flow rate, thus when the refrigerant flow rate to one evaporator is next controlled to the return value, the refrigerant flow rate by the return value can be controlled appropriately.

According to the invention stated in Claim 23, in the circumstance that the refrigerant flow rate to one evaporator is limited and adjusted, when the number of revolutions of the compressor is large, the pressure loss at the limiting section of the refrigerant is large, and the cooling efficiency is lowered, though when the number of revolutions of the compressor is large, the upper limit value is provided for the refrigerator flow ratio to one evaporator, and thus the refrigerator flow ratio to one evaporator is increased and the pressure loss can be prevented.

When the air temperature in the installation place of the refrigerator is low, the load of the freezing cycle is reduced, and the control for the refrigerant flow ratio on the basis of the superheat amount of one evaporator can be executed appropriately, so that if the upper limit value is made higher when the air temperature is low, the refrigerant amount to one evaporator is too large, and the superheat amount overshoots excessively, though according to the invention stated in Claim 24, when the air temperature is low, the upper limit value is not changed, thus the refrigerant flow rate into one evaporator can be prevented from excessive.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings.

FIG. 12 is a transverse sectional view showing the position relationship between the slit according to the opening of the valve body of the regulating valve and the valve opening.

FIG. 21 is a drawing showing a relationship between an opening of the regulating valve and a superheat amount of the refrigerating evaporator under the control shown in FIG. 20.

FIG. 22 is a drawing showing an example of a set value of an upper limit value of an opening of the valve body of the regulating valve.

BEST MODE FOR CARRYING OUT THE INVENTION

Figure 1:
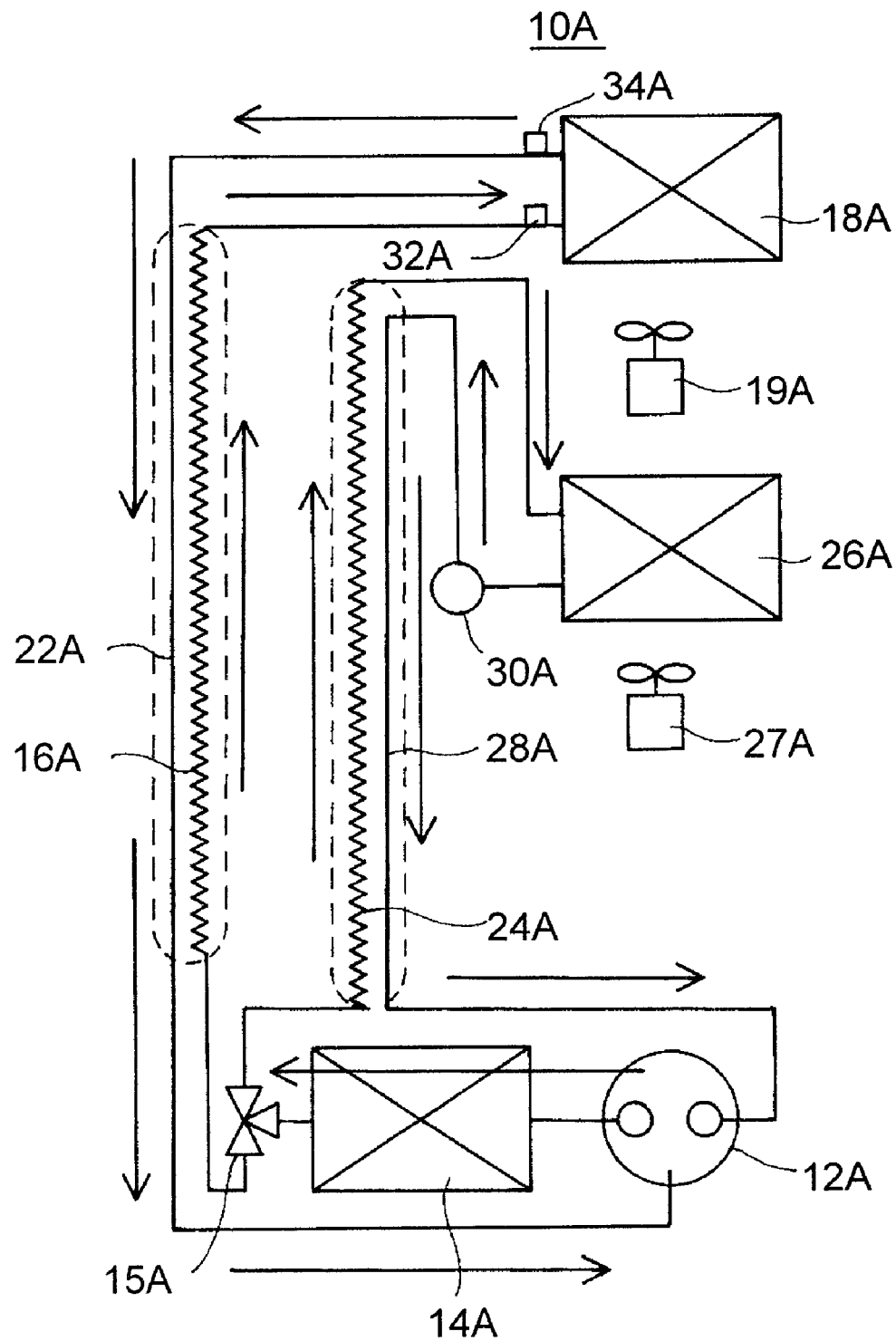
FIG. 1 is block diagram of a freezing cycle showing an embodiment of the present invention which is a state in a simultaneous cooling mode.

Referring now to the drawings, wherein like reference numerals designate identical or corresponding parts throughout the several views, the embodiments of this invention will be described below.

Firstly, an embodiment of the present invention will be explained with reference to FIGS. 1 to 6.

(1) Structure of a Refrigerator 1A

Figure 3:
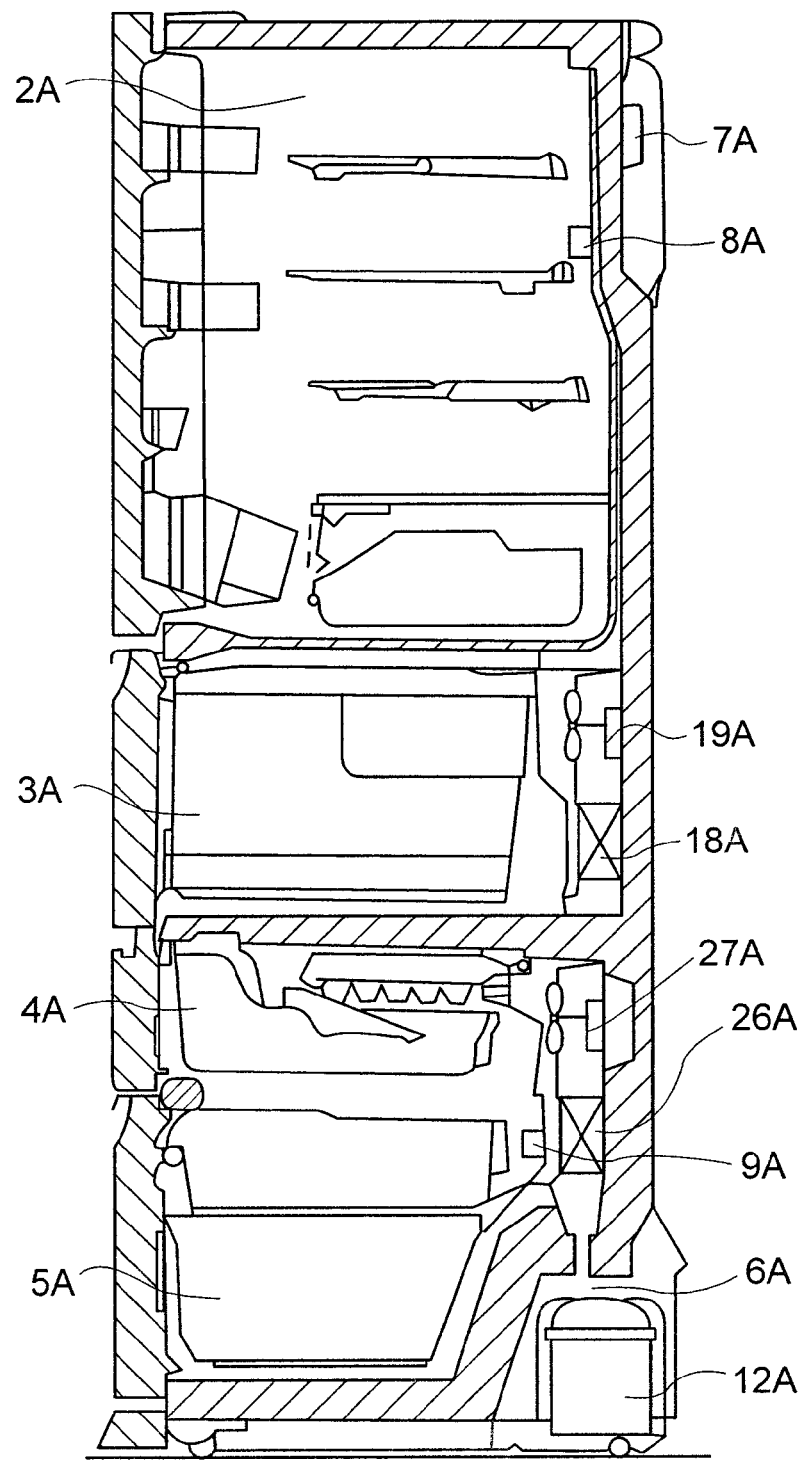
FIG. 3 is a vertical sectional view of a refrigerator of this embodiment.

Firstly, the structure of refrigerator 1A will be explained by referring to FIG. 3.

Inside refrigerator 1A, starting from the upper stage, a refrigerating chamber 2A, a vegetable chamber 3A, an ice making chamber 4A, and a freezing chamber 5A are installed.

In a machine chamber 6A on the back of freezing chamber 5A, a two-stage compressor (hereinafter, referred to as just a compressor) 12A of a capacity variable type is installed.

On the back of ice making chamber 4A, an evaporator (hereinafter, referred to as an F evaporator) 26A for a freezing chamber for cooling ice making chamber 4A and freezing chamber 5A is installed.

Furthermore, on the back of vegetable chamber 3A, an evaporator (hereinafter, referred to as an R evaporator) 18A for a refrigerating chamber for cooing refrigerating chamber 2A and vegetable chamber 3A is installed.

Above F evaporator 26A, a fan (hereinafter, referred to as an F fan) 27A for sending cold air cooled by F evaporator 26A to ice making chamber 4A and freezing chamber 5A is installed.

Above R evaporator 18A, a fan (hereinafter, referred to as an R fan) 19A for sending cold air cooled by R evaporator 18A to refrigerating chamber 2A and vegetable chamber 3A is installed.

Behind a ceiling of refrigerator 1A, a controller 7A composed of a microcomputer is installed.

Further, in refrigerating chamber 2A, an R sensor 8A for measuring the temperature in the chamber is arranged, and in freezing chamber 5A, an F sensor 9A for measuring the temperature in the chamber is arranged.

(2) Structure of a Freezing Cycle 10A

The structure of freezing cycle 10A of refrigerator 1A will be explained by referring to FIGS. 1 and 2.

To an outlet of compressor 12A on the high pressure side, a condenser 14A is connected, and to condenser 14A, a pulse motor valve (hereinafter, abbreviated to a PMV) 15A is connected. PMV 15A is of a cross valve type and has one entrance and two exits. The amounts of refrigerant flowing out from the two exits, that is, a refrigerating side exit and a freezing side exit are respectively decided by adjusting openings of the valves of both exits by a pulse motor. The adjustment depends on a number of pulses outputted from controller 7A to the pulse motor, and the relationship thereof is as shown in FIG.

6. When using PMV 15A, from a fully opening state to a fully closing state, an opening thereof can be adjusted linearly by the pulse.

To an exit of PMV 15A on the refrigerating side, a refrigerating capillary tube (hereinafter, referred to as an R capillary tube) 16A and R evaporator 18A are connected sequentially.

An exit side of R evaporator 18A is connected to a suction port of compressor 12A on the intermediate pressure side via an intermediate pressure suction pipe 22A.

An exit of PMV 15A on the freezing side is connected to F evaporator 26A via a freezing capillary tube (hereinafter, referred to as an F capillary tube) 24A. An exit side of F evaporator 26 is connected to a suction port of compressor 12A on the low pressure side via a low-pressure suction pipe 28A. Further, on the route of low-pressure suction pipe 28A, an accumulator 30A is installed.

R capillary tube 16A and intermediate pressure suction pipe 22A are installed in the neighborhood of each other so as to realize heat exchange. Heat is given to intermediate pressure suction pipe 22A from R capillary tube 16A like this, and thus a liquid refrigerant in intermediate pressure suction pipe 22A can be evaporated, and compressor 12A can be prevented from a liquid back.

F capillary tube 24A and low-pressure suction pipe 28A are also installed in the neighborhood of each other so as to realize heat exchange. Heat is given to low-pressure suction pipe 28A from F capillary tube 24A like this, and thus the liquid refrigerant is evaporated, and compressor 12A can be prevented from a liquid back.

Further, at an entrance of R evaporator 18A, an entrance sensor 32A for measuring a temperature of the refrigerant flowing into R evaporator 18A is installed, and at an exit thereof an exit sensor 34A for measuring a temperature of the refrigerant flowing from R evaporator 18A is installed.

(3) Electric Constitution of Refrigerator 1A

Figure 4:
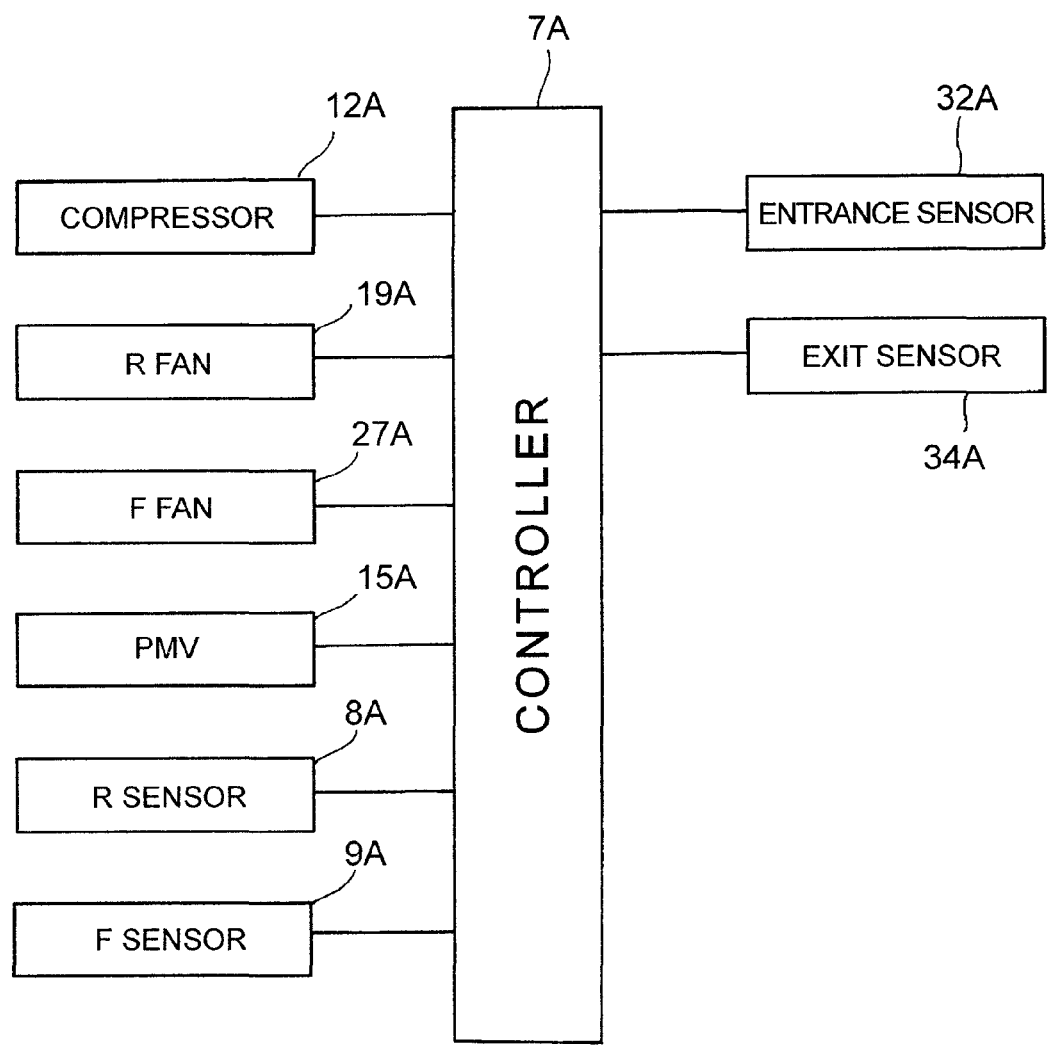
FIG. 4 is a block diagram of the refrigerator of this embodiment.

Next, an electric constitution of refrigerator 1A will be explained by referring to FIG. 4.

To controller 7A for controlling refrigerator 1A, a motor of compressor 12A, R fan 19A, F fan 27A, PMV 15A, R sensor 8A, F sensor 9A, entrance sensor 32A, and exit sensor 34A are connected.

Controller 7A, on the basis of a prestored program (a program for realizing an operation condition indicated below) and on the basis of an inner temperature (hereinafter, referred to as an R temperature) of refrigerating chamber 2A detected by R sensor 8A, an inner temperature (hereinafter, referred to as an F temperature) of freezing chamber 5A detected by F sensor 9A, and detected temperatures of entrance sensor 32A and exit sensor 34A, controls compressor 12A, R fan 19A, F fan 27A, and PMV 15A.

(4) Operation Condition of Refrigerator 1A

Next, a control condition of refrigerator 1A based on controller 7A will be explained.

Controller 7A outputs pulses to PMV 15A, and thereby can execute a simultaneous cooling mode for simultaneously cooling refrigerating chamber 2A and vegetable chamber 3A (hereinafter, both are referred to as refrigerating chamber 2A together) and ice making chamber 4A and freezing chamber 5A (hereinafter, both are referred to as freezing chamber 5A together), and a freezing mode for cooling only freezing chamber 5A.

(4-1) Freezing Mode

Firstly, the freezing mode will be explained.

Figure 2:
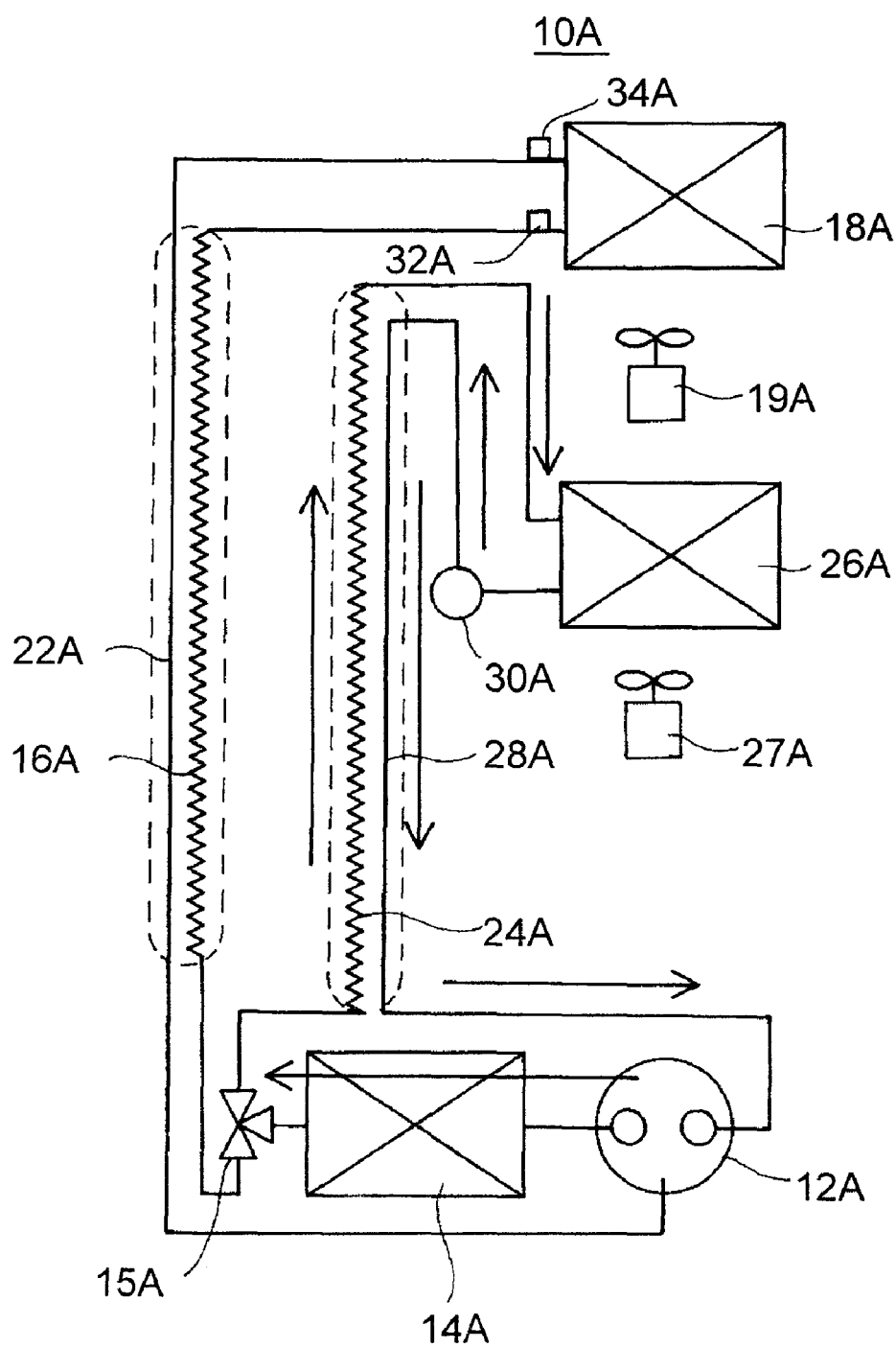
FIG. 2 is a drawing showing a state of a freezing cycle in a freezing mode.

The freezing mode, as shown in FIG. 2, closes the exit of PMV 15A on the refrigerating side so as to allow the refrigerant flow only to the freezing side exit. The refrigerant flows on a route that it passes through compressor 12A, condenser 14A, PMV 15A, F capillary tube 24A, F evaporator 26A, and then low-pressure suction pipe 28A, and returns to compressor 12A.

And, compressor 12A is operated, thus F evaporator 26A is cooled, and freezing chamber 5A is cooled.

Figures 6, 7:
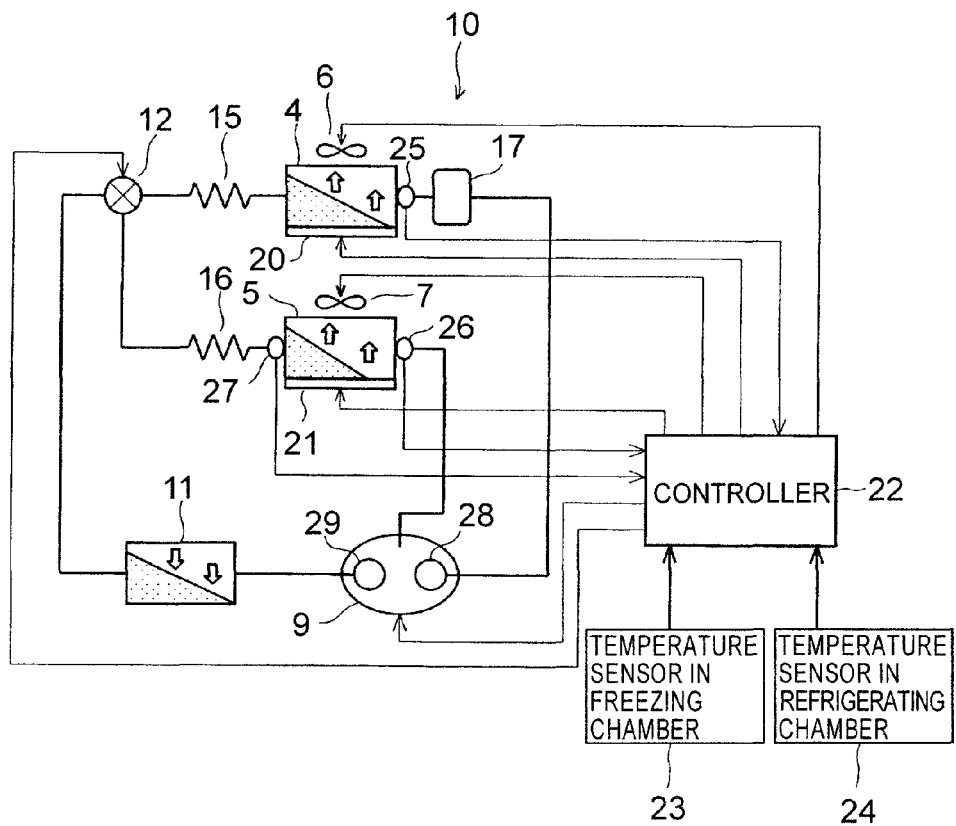
FIG. 6 is a table showing the condition of a number of pulses and an opening in the PMV of this embodiment.
FIG. 7 is a schematic view showing a freezing system in another embodiment of the present invention.

As shown in FIG. 6, a number of the pulses outputted from controller 7A to PMV 15A in the freezing mode is 61 pulses. Then, the exit of PMV 15A on the refrigerating side is closed, and the refrigerant flows only from the freezing side exit.

Further, the adjustment of the inner temperature of freezing chamber 5A is performed by changing the capacity of compressor 12A on the basis of the temperature detected by F sensor 9A. For example, when the inner temperature rises, an operation frequency of the motor of compressor 12A is increased.

(4-2) Simultaneous Cooling Mode

Next, the simultaneous cooling mode will be explained.

The simultaneous cooling mode, as shown in FIG. 1, is a mode for allowing the refrigerant to flow simultaneously from the two exits of PMV 15A, and thereby simultaneously cooling R evaporator 18A and F evaporator 26A, and for simultaneously cooling refrigerating chamber 2A and freezing chamber 5A.

There are two refrigerant flows available in the simultaneous cooling mode.

A first flow is a route that the refrigerant flows from compressor 12A to condenser 14A, passes through PMV 15A, R capillary tube 16A, R evaporator 18A, and intermediate pressure suction pipe 22A, and then returns to compressor 12A. A second flow is a route that the refrigerant flows from compressor 12A to condenser 14A, passes through PMV 15A, F capillary tube 24A, F evaporator 26A, and low-pressure suction pipe 28A, and then returns to compressor 12A.

In this case, a diameter of R capillary tube 16A is made larger than a diameter of F capillary tube 24A so as to reduce the flow rate resistance of the refrigerant, thus the refrigerant flows more easily into R capillary tube 16A than F capillary tube 24A.

As shown in FIG. 6, a number of pulses outputted from controller 7A to PMV 15A in the simultaneous cooling mode is 70 to 81 pulses. Then, the exit of PMV 15A on the freezing side is fully opened, and the opening of the refrigerating side exit is adjusted, and thus the refrigerant flow rate can be adjusted.

Further, as a refrigerant condition inside R evaporator 18A, the refrigerant at the entrance of R evaporator 18A is liquid refrigerant, and the liquid refrigerant is evaporated inside R evaporator 18A and becomes a gas refrigerant immediately before the exit. Therefore, no liquid back will be caused in the suction port of compressor 12A on the intermediate pressure side via intermediate pressure suction pipe 22A. In order to produce the gas refrigerant immediately before the exit like this, the temperatures in the neighborhood of the entrance and the exit of R evaporator 18A are measured respectively by entrance sensor 32A and exit sensor 34A, and to make the difference between the measured entrance temperature and the exit temperature (the exit temperature–the entrance temperature) coincide with a preset temperature difference, the refrigerant flow rate to R evaporator 18A of PMV 15A is adjusted. The preset temperature difference is from 1° C. to 5° C., and preferably is from 2° C. to 4° C.

The temperature difference control method will be explained below.

(4-3) First Temperature Difference Control Method

A first temperature difference control method will be explained on the basis of a flow chart shown in FIG. 5.

Figure 5:
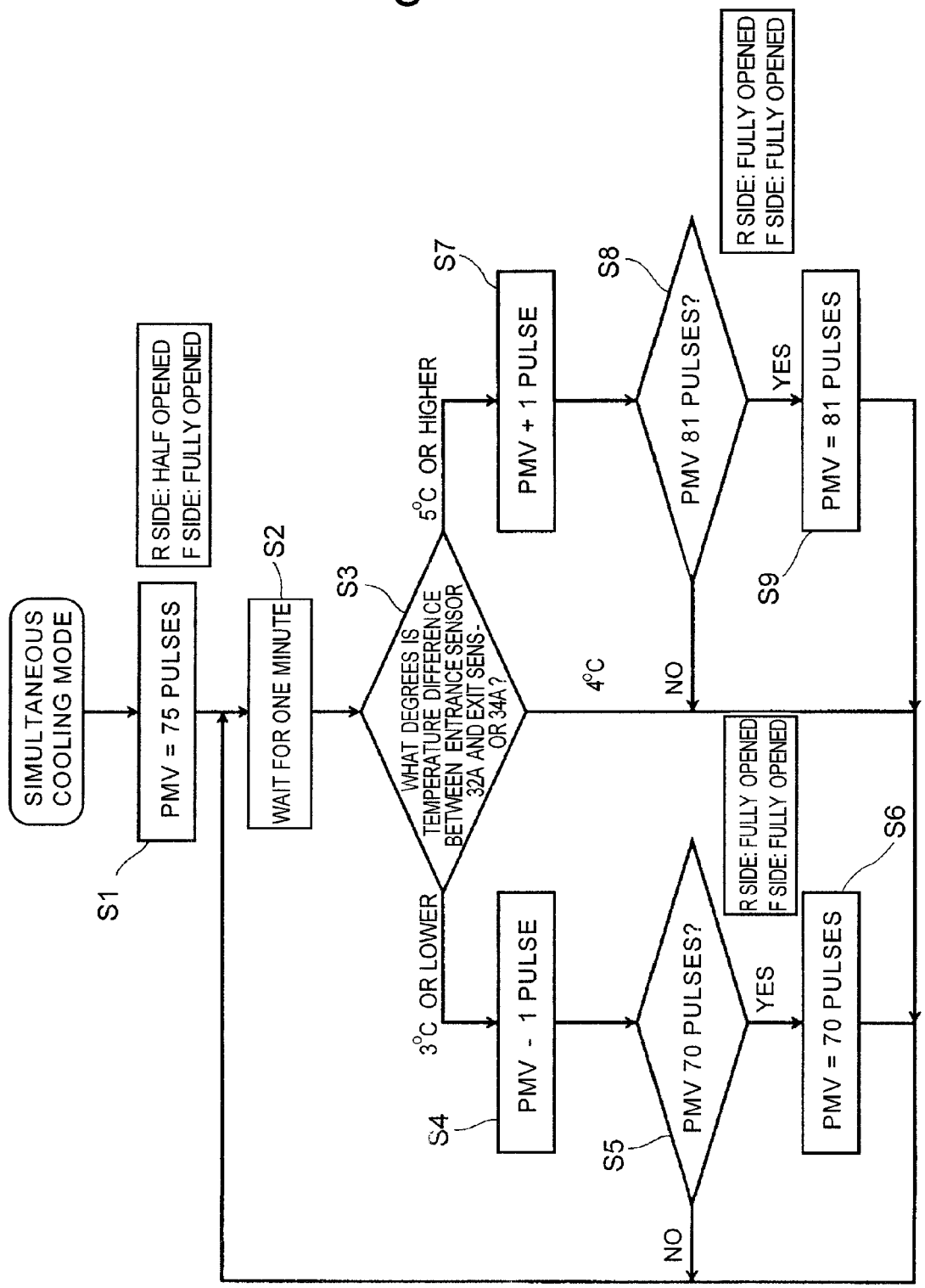
FIG. 5 is a flow chart in the simultaneous cooling mode of this embodiment.

When the freezing mode is switched to the simultaneous cooling mode, the first temperature difference control method in the simultaneous cooling mode shown in FIG. 5 is executed.

At a Step S1, controller 7A outputs 75 pulses to PMV 15A. Then, PMV 15A opens half its refrigerating side exit and opens fully its freezing side exit.

At a Step S2, this state is kept for one minute. By doing this, the refrigerant extends all over inside freezing cycle 10A and the state of freezing cycle 10A is stabilized.

At a Step S3, it is judged what ° C. the difference is between the detected temperatures of entrance sensor 32A and exit sensor 34A. Here, the preset temperature difference aforementioned is 4° C. And, when the preset temperature difference is 4° C., the liquid refrigerant inside R evaporator 18A all evaporates to the gas refrigerant immediately before the exit and cools R evaporator 18A to a target temperature, and the state is that no liquid back is caused to compressor 12A. Therefore, when the preset temperature difference is 4° C., the process returns to Step S2, and this state is kept for one minute, and the process goes again to Step S3.

When the temperature difference at Step S3 is 3° C. or smaller, it is lower than the preset temperature difference, thus the liquid refrigerant does not all evaporate inside R evaporator 18A, and the state is that the liquid back is apt to be caused, so that at a Step S4, controller 7A outputs a signal of −1 pulse to PMV 15A to slightly limit the opening of PMV 15A. By doing this, PMV 15A closes the refrigerating side exit in correspondence to one pulse and reduces the flow rate of the liquid refrigerant to R evaporator 18A. And, when the temperature difference is not shortened, PMV 15A closes sequentially the refrigerating side exit one pulse by one pulse via a Step S5 and reduces the flow rate of the liquid refrigerant to R evaporator 18A. When the number of the pulses reaches 70, the refrigerating side exit is fully closed and no refrigerant flows.

At Step S5, it is judged whether the refrigerating side exit of PMV 15A is fully closed (the number of the pulses is 70) or not. When PMV 15A is not closed fully, the process returns to Step S2, keeps the state for one minute, and judges whether the liquid refrigerant in R evaporator 18A evaporates all or not. And, the process keeps the state for one minute, then goes to Step S3 again, and measures the difference between the entrance temperature and the exit temperature. On the other hand, when PMV 15A is closed fully (that is, the number of the pulses is 70), the process goes to a Step S6.

At Step S6, the process sets the number of pulses to 70, keeps PMV 15A in the fully closed state, and returns to Step S2.

Due to the aforementioned flow from Step S2 to Step S3, Step S4, Step S5, and Step S6, even if the liquid refrigerant does not all evaporate in R evaporator 18A, the refrigerating side exit is closed gradually, and thus the liquid refrigerant gets less, and the liquid refrigerant can all evaporate surely in R evaporator 18A. Therefore, compressor 12A can be prevented from a liquid back.

Next, at Step S3, when the difference between the entrance temperature and the exit temperature is higher than the preset temperature difference, that is, 5° C. or higher, controller 7A, as shown at a Step S7, increments the pulse to PMV 15A by one pulse, opens the opening of the refrigerating side exit of PMV 15A, and increases the refrigerant flow rate. The reason is that when the temperature difference is the preset temperature difference or higher, it means that the flow rate of the liquid refrigerant in R evaporator 18A is little and R evaporator 18A is not cooled sufficiently, so that the refrigerant flow rate is increased so as to cool R evaporator 18A. This control is continued until PMV 15A is opened fully.

At a Step S8, it is judged whether PMV 15A is opened fully (the number of pulses is 81) or not, and when it is not opened fully, the process returns to Step S2.

At Step S8, when PMV 15A is opened fully (that is, the number of pulses is 81), the process keeps the state at a Step S9 and returns to Step S2.

As mentioned above, the flow rate of the refrigerant flowing through R evaporator 18A is adjusted by PMV 15A, and thus R evaporator 18A can be cooled surely, and compressor 12A can be prevented from a liquid back.

Further, in the first control method, the reason that the opening of PMV 15A is set at the center, that is, the number of pulses is set at 75 is that when the opening is set at the center, the control can be made easily to either of the fully opened state and the fully closed state.

(4-4) Second Temperature Difference Control Method

Next, a second temperature difference control method will be explained.

In the first control method aforementioned, the refrigerant flow rate is adjusted only by PMV 15A, while in this control method, in addition to it, the number of revolutions of R fan 19A is controlled, and thus the refrigerant flow rates is adjusted.

As for the second control method, there are following two control methods available.

(4-4-1) (2-1)th Temperature Control Method

A (2-1)th temperature difference control method corresponds the number of revolutions of R fan 19A to the opening of the valve of PMV 15A, and when the opening of the valve of PMV 15A is apt to close or when it is in the fully closed state, the number of revolutions of R fan 19A is increased more than a predetermined number of revolutions. Further, when inversely PMV 15A is fully opened or is set into the fully opened state, the number of revolutions of R fan 19A is reduced less than the predetermined number of revolutions.

By this control method, when the number of revolutions of R fan 19A is increased, the evaporation of the liquid refrigerant is promoted, and the liquid back can be prevented more surely. On the other hand, when the number of revolutions is decreased, the refrigerant evaporated from the liquid refrigerant can be suppressed and the cooling by R fan 19A can be executed surely.

(4-4-2) (2-2)th Temperature Difference Control Method

In a (2-2)th temperature difference control method, when the difference between the entrance temperature and the exit temperature is low, the refrigerant flow rate is adjusted only by the number of revolutions of R fan 19A, and when the temperature difference is high, the refrigerant flow rate is adjusted by the opening of PMV 15A instead of the number of revolutions of R fan 19A.

In this control method, the refrigerant flow rate is changed greatly and adjusted by PMV 15A, and by R fan 19A, the refrigerant flow rate can be adjusted finely, so that they are used appropriately.

(4-5) Third Temperature Difference Control Method

In the first control method and the second control method, the flow rate is adjusted by PMV 15A, while in this control method, the flow rate is controlled only by R fan 19A instead of PMV 15A.

In this case, when the difference between the entrance temperature and the exit temperature is high, the number of revolutions of refrigerating fan 19A is reduced, and when the temperature difference is low, the number of revolutions thereof is increased, thus the flow rate can be controlled.

Hereinafter, another embodiment of the present invention will be explained by referring to FIGS. 7 to 34.

Figure 8:
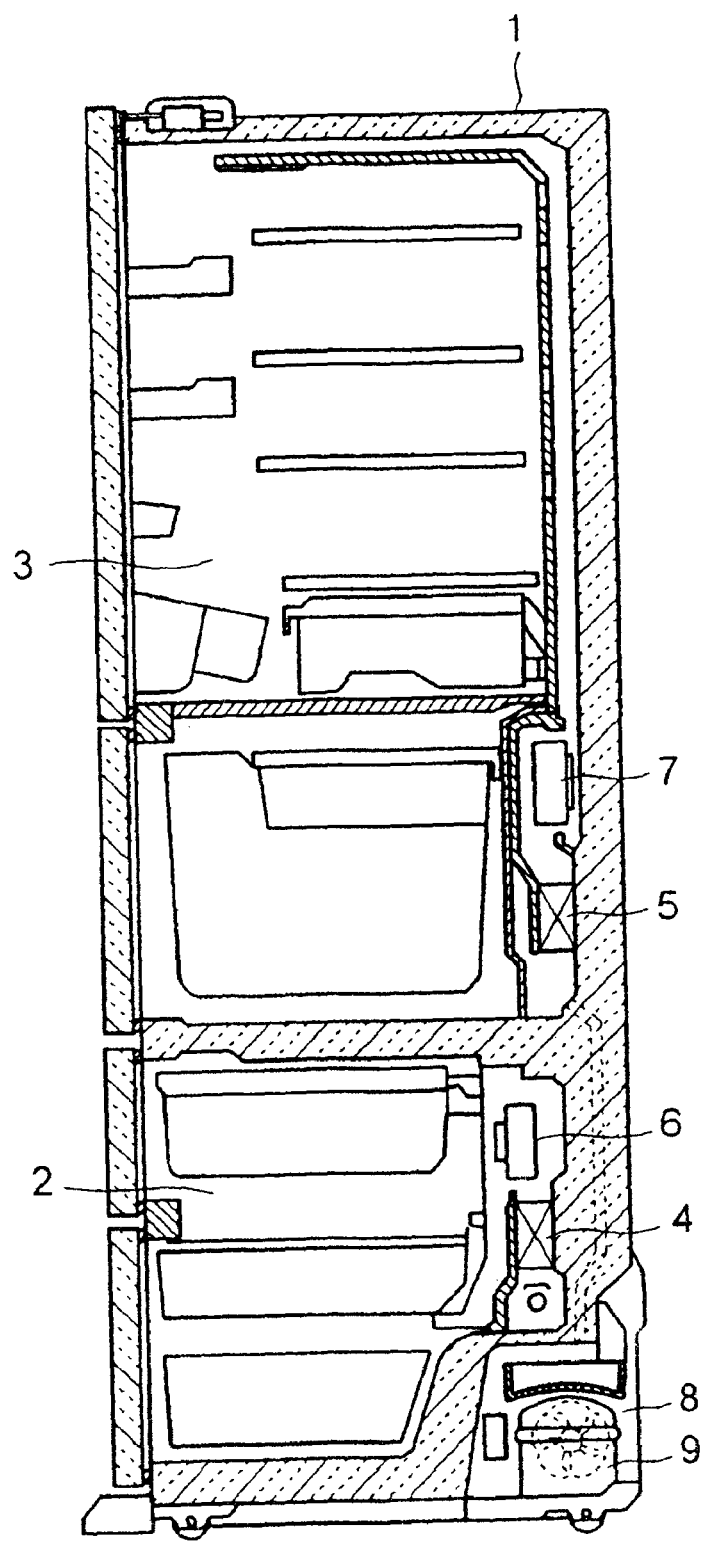
FIG. 8 is a vertical sectional view of a refrigerator of the another embodiment of the present invention.

FIG. 8 shows a vertical sectional view of a refrigerator of another embodiment of the present invention. In FIG. 8, a refrigerator body 1 forms storage sections inside a heat insulating box, and divides the box into a plurality of storage chambers by partition walls such as freezing section 2 composed of a freezing chamber and an ice making chamber and refrigerating section 3 composed of a refrigerating chamber and a vegetable chamber.

The storage chambers are respectively cooled and held at predetermined set temperatures by a freezing evaporator 4, a refrigerating evaporator 5, and cold air circulating fans 6 and 7 which are respectively arranged in freezing section 2 and refrigerating section 3, and evaporators 4 and 5 are cooled by a refrigerant supplied from a compressor 9 installed in a machine chamber 8 on the lower part of the back of the main body.

FIG. 7 shows a freezing cycle device in the refrigerant of the another embodiment of the present invention. In FIG. 1, a freezing cycle device 10 is structured so as to connect compressor 9, a condenser 11, a regulating valve (equivalent to a refrigerant flow rate adjustment means) 12 for adjusting a refrigerant flow rate on a refrigerant flow path, and freezing evaporator 4 and refrigerating evaporator 5 connected in parallel, in a ring shape. Condenser 11 is in a flat shape and is arranged in the outside bottom space of refrigerator body 1 in front of machine chamber 8. The refrigerant liquefied by condenser 11 is supplied to freezing evaporator 4 and refrigerating evaporator 5 via a freezing side capillary tube 15 and a refrigerating side capillary tube 16, which are decompression means, via regulating valve 12. Evaporators 4 and 5 are lowered in temperature due to the evaporation of the refrigerant and cool the insides of the storage chamber to predetermined air temperatures by heat exchange by the airs sent by cold air circulating fans 6 and 7, respectively. It is constructed such that the refrigerant evaporated by freezing evaporator 4 is returned again to compressor 9 via an accumulator 17 and a freezing side suction pipe 18, and the refrigerant evaporated by refrigerating evaporator 5 is directly returned to compressor 9 via a refrigerating side suction pipe 19.

In correspondence with evaporators 4 and 5, defrosting heaters 20 and 21 are installed, and whenever predetermined periods of times elapse, heaters 20 and 21 are supplied with electric currents, and thus the frosts attached to evaporators 4 and 5 thaw, respectively.

Controller 22, on the basis of the detected temperatures of a temperature sensor 23 in the freezing chamber and a temperature sensor 24 in the refrigerating chamber, controls freezing cycle device 10 aforementioned, and in addition to the ordinary freezing cycle operation, on the basis of the detected temperatures of an exit temperature sensor 25 attached to an exit pipe of freezing evaporator 4 and an exit temperature sensor 26 attached to an exit pipe of refrigerating evaporator 5, performs the defrosting operation for thawing frosts attached to freezing evaporator 4 and refrigerating evaporator 5, and furthermore, on the basis of the difference between a detected temperature of an entrance temperature sensor 27 attached to an entrance pipe of refrigerating evaporator 5 and the detected temperature of exit temperature sensor 26, obtains a superheat amount (a superheat amount) of refrigerating evaporator 5 which will be described later (entrance temperature sensor 27 and exit temperature sensor 26 function also as superheat amount detecting means), and controls the refrigerant flow ratio to refrigerating evaporator 5 of regulating valve 12 on the basis of the superheat amount, and such control is a characteristic of this embodiment.

Figure 9:
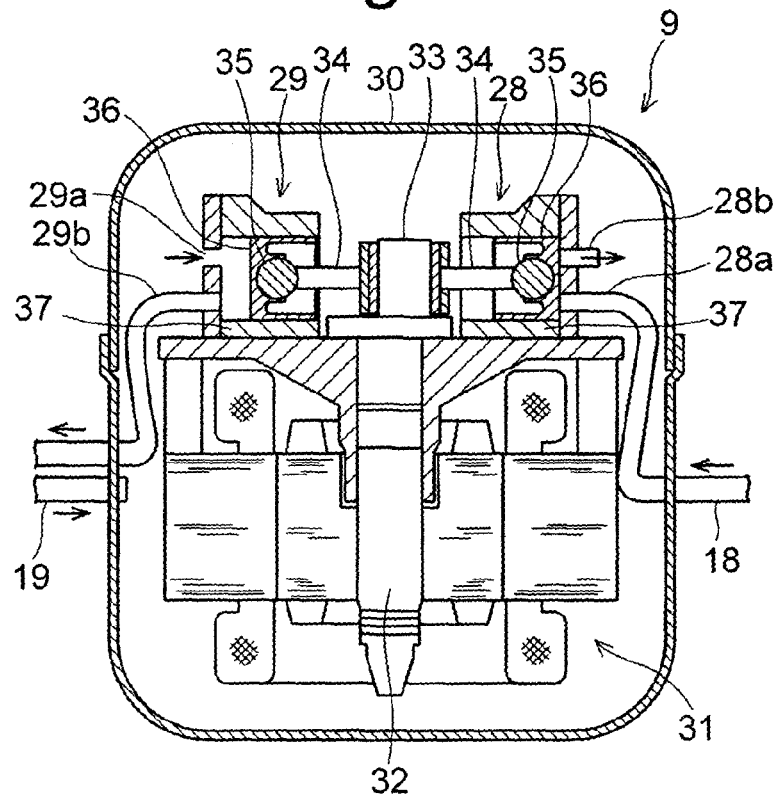
FIG. 9 is a vertical sectional view of the compressor of the another embodiment of the present invention.

FIG. 9 shows a section of compressor 9 of the another embodiment of the present invention. In FIG. 9, compressor 9 is a reciprocal two-stage compressor whose compression element is composed of a low-pressure stage side compression section 28 and a high-pressure stage side compression section 29, and is structured so as to move a cone rod 34 reciprocally in the horizontal direction in the drawing by an eccentric shaft 33 eccentrically rotating in correspondence with the rotation of a rotation shaft 32 of an electric motor 31 stored in a closed case 30.

At front ends of cone rod 34, pistons 36 are caulked and fixed by ball joints 35, respectively, and by the reciprocating motion of pistons 36 in cylinders 37, low-pressure stage side compression section 28 and high-pressure stage side compression section 29 alternately suck in the refrigerant, compress and discharge it, and by adoption of ball joints 35 to the compression sections, the volume efficiency is improved, and the enlargement of the external form space of the two-stage compressor originally requiring two compression sections is suppressed.

A suction port 28a of low-pressure stage side compression section 28 is connected to an end of freezing side suction pipe 18 connected from freezing evaporator 4 via accumulator 17, and a discharge port 28b of low-pressure stage side compression section 28 is opened inside closed case 30 so as to discharge compressed gas refrigerant. Further, a suction port 29a of high-pressure stage side compression section 29 is opened inside closed case 30 so as to suck in the gas refrigerant in closed case 30, and a discharge port 29b of high-pressure stage side compression section 29 is connected to a discharge pipe to condenser 11.

Accumulator 17 connected to the discharge side of freezing evaporator 4 separates a gas refrigerant and a liquid refrigerant, stores the liquid refrigerant not evaporated in freezing evaporator 4, sends only the gas refrigerant, thereby performs an operation for preventing obstacles that the liquid refrigerant flows into cylinder 37 of compressor 9, and in this embodiment, accumulator 17 is installed only on a later stage of freezing evaporator 4.

Refrigerating side suction pipe 19 from refrigerating evaporator 5 is connected so as to be introduced into a space section which is an intermediate pressure stage in closed case 30 of compressor 9. Therefore, a sucked refrigerant from refrigerating evaporator 5 does not flow directly into cylinder 37 of compressor 9, so that there is no need particularly to install the accumulator on the later stage of refrigerating evaporator 5, and when installing it, it may be a small one. The gas refrigerant sucked from refrigerating side suction pipe 19 on the side of refrigerating evaporator 5, together with the gas refrigerant discharged into closed case 30 from discharge port 28b of low-pressure stage side compression section 28, is sucked and compressed in suction port 29a of high-pressure stage side compression section 29 interconnected.

Regulating valve 12 is installed on the exit side of condenser 11 for receiving and liquefying discharged gas from compressor 9, switches the refrigerant flow path to freezing evaporator 4 or to refrigerating evaporator 5, and controls the refrigerant flow ratio (opening rate to fully opening) thereof. In this embodiment, under the ordinary control, regulating valve 12 controls a refrigerant flow ratio to refrigerating evaporator 5 and also controls a refrigerant flow ratio to freezing evaporator 4 to 100% (fully opening). In this case, when limiting and adjusting the refrigerant flow rate to refrigerating evaporator 5, a sufficient amount of the refrigerant is supplied to freezing evaporator 4.

Figure 10:
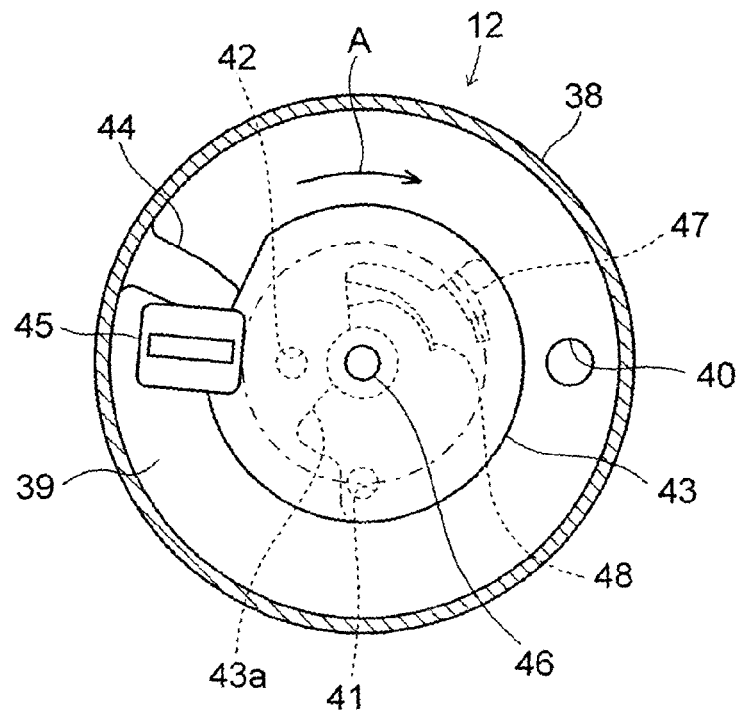
FIG. 10 is a transverse sectional view of the regulating valve of the another embodiment of the present invention.
Figure 11:
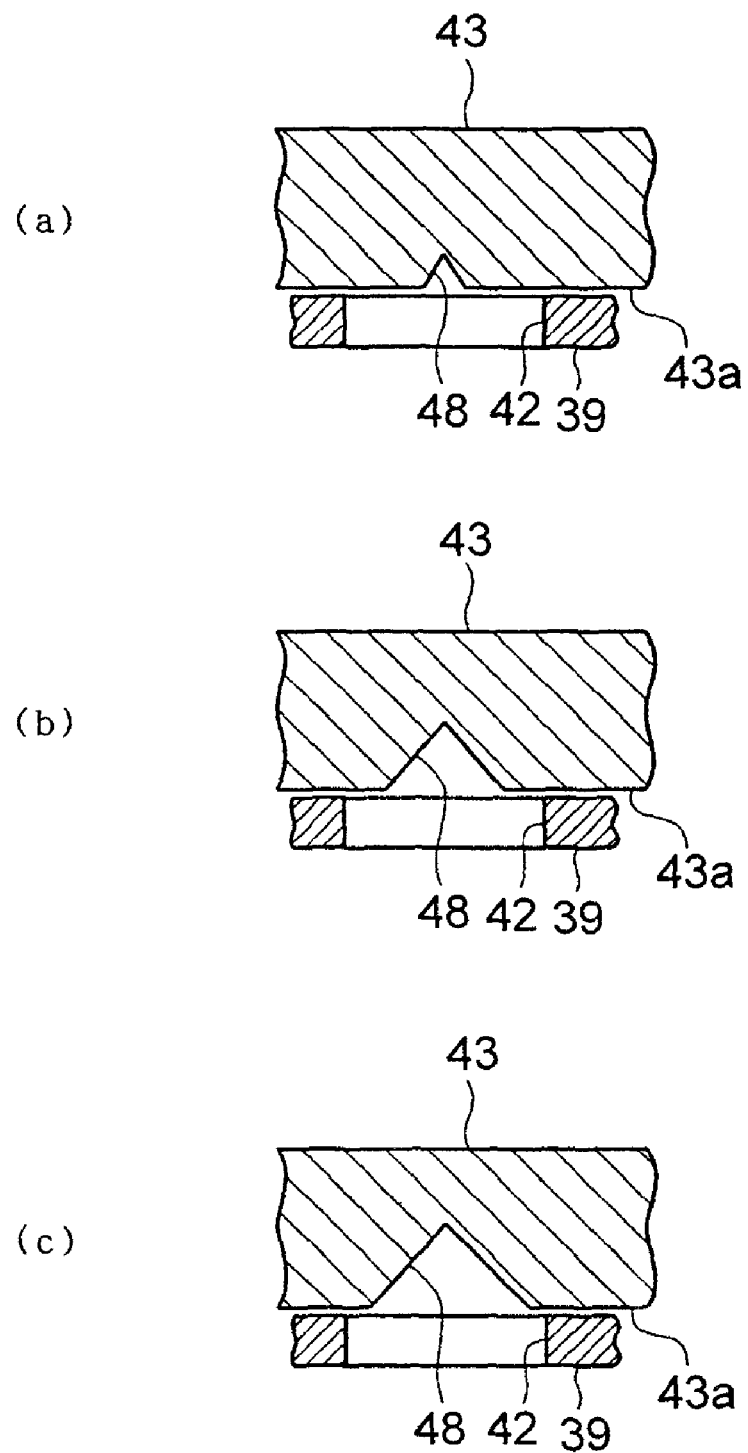
FIG. 11 is a cross sectional view of an essential section showing an interconnection condition between a slit of the valve body of the regulating valve and the valve opening thereof.

FIG. 10 shows a section of regulating valve 12 of the another embodiment of the present invention. As shown in FIG. 10, on a valve seat 39 formed on a bottom of a valve case 38, a refrigerant flow entrance 40 from condenser 11 (actually a drier) is formed, and a freezing side valve opening 41 which is a refrigerant flow exit to freezing evaporator 4 and a refrigerating side valve opening 42 which is a refrigerant flow exit to refrigerating evaporator 5 are formed.

A disc type valve body 43 is rotatably supported by a rotation shaft 46 so as to slide for valve seat 39, and the basic structure thereof is similar to the cross valve. On the side of valve body 43, a stopper 44 is attached, and stopper 44 makes contact with a restriction section 45 attached to valve seat 39, thus a rotation start position of valve 43 and a rotation end position thereof are decided.

On the bottom (the opposite surface to valve seat 39) of valve body 43, a thick step 43a is integrally expanded and formed, and thick step 43a can fully close freezing side valve opening 41 and refrigerating side valve opening 42. On the back (the sliding surface with valve body 39) of thick step 43a, on the rotation tracks opposite to valve openings 41 and 42, a freezing side slit 47 and a refrigerating side slit 48 each having a V-shaped section are respectively formed in a circular arc shape at predetermined angles from an end of thick step 43a, and when valve body 43 is positioned within a predetermined rotation range, freezing side slit 47 is opposite to and is interconnected to freezing side valve opening 41, and refrigerating side slit 48 is opposite to and is interconnected to refrigerating side valve opening 42.

Valve body 43 is magnet-coupled so as to rotate in synchronization with the rotation of a not-shown stepping motor installed on the top of valve case 38, and is rotated and controlled at a position of 0 to 85 pulses by an open loop by the stepping motor.

Further, FIG. 10 shows an initial position where stopper 44 makes contact with restriction section 45, and at the initial position, the number of the pulses of the stepping motor is set to 0.

The stepping motor rotates valve body 43 from the initial position shown in FIG. 10 in the direction of an arrow A by a pulse signal from controller 22, and when freezing side slit 47 of valve body 43 is interconnected to freezing side valve opening 41 at a predetermined pulse position, the refrigerant flowing into valve case 38 from flow entrance 40 flows out from freezing side valve opening 41 interconnected to freezing side slit 47, flows into freezing evaporator 4 via freezing side capillary tube 15 and evaporates, and thus the temperature of freezing evaporator 4 lowers.

On the other hand, similarly when refrigerating side slit 48 and refrigerating side valve opening 42 are interconnected to each other, the refrigerant flowing into refrigerating side slit 48 flows into refrigerating evaporator 5 from refrigerating side valve opening 42 interconnected via refrigerating side capillary tube 16 and evaporates, and thus the temperature of refrigerating evaporator 5 lowers.

In this case, the refrigerant flow rates flowing out from freezing side valve opening 41 and refrigerating side valve opening 42 vary with the sizes of sectional areas of freezing side slit 47 and refrigerating side slit 48 opposite to valve openings 41 and 42, respectively, and as the sectional area increases as shown in FIGS. 11(a) to 11(c), the refrigerant flow rate increases. Further, FIGS. 11(a) to 11(c), as an example, show refrigerating side valve opening 42.

Here, a sectional area of freezing side slit 47 is set to be constant between a starting end portion (the front end of valve body 43 in the rotational direction) and a middle portion thereof regardless of the position of valve body 43 in the rotational direction, and a sectional area between the middle portion and a terminal portion (the opened edge of thick section 43a) is set to be a fixed sectional area larger than that of the starting end potion side. Further, a sectional area of refrigerating side slit 48 is set to increase from a starting end portion to a terminal portion, particularly set to increase little between the starting end portion and a predetermined middle portion, and set to increase large between the middle portion and the terminal portion. Furthermore, the starting end portion of refrigerating side slit 48 is formed in a shape so as to ensure a predetermined flow ratio from the fully closed state at a stretch, in the state that the terminal portion of refrigerating side slit 48 starts an interconnection with refrigerating side valve opening 42.

By use of the aforementioned constitution, regulating valve 12, as described later, can control finely switching of the flowing path and adjustment of the flow rate, so that the refrigerant flow ratio can be changed linearly under the rotation control by the stepping motor.

Figure 13:
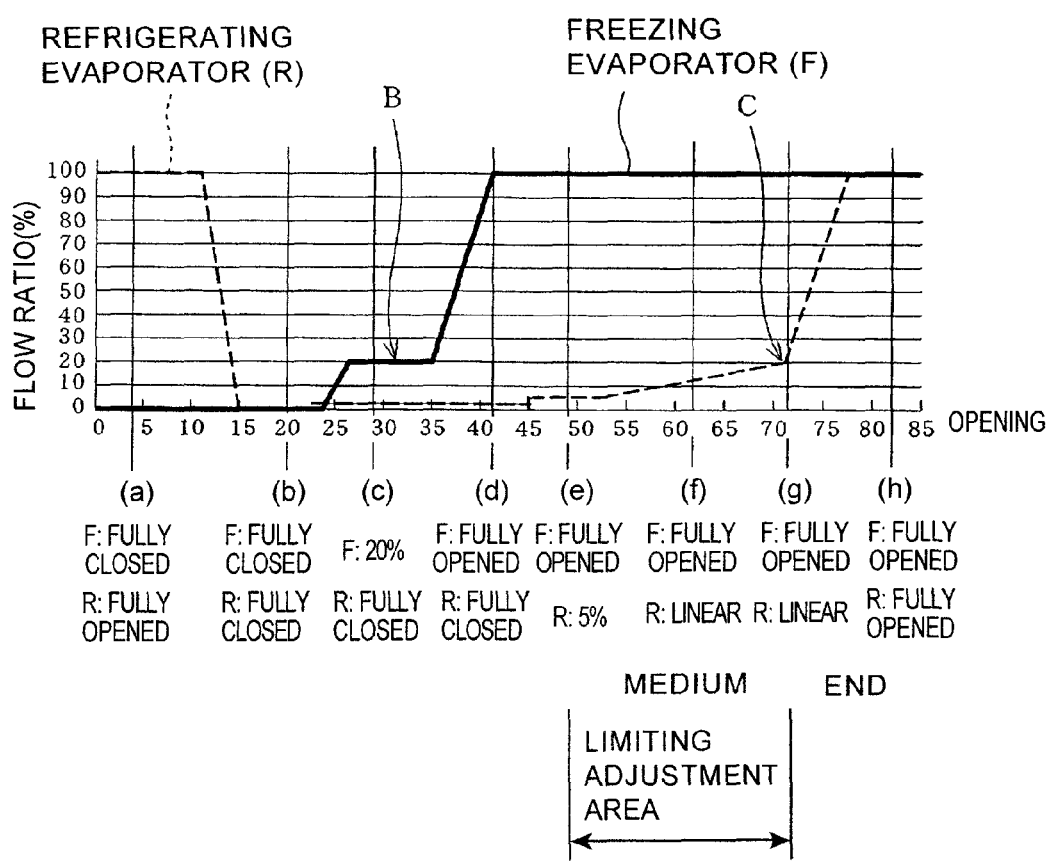
FIG. 13 is a drawing showing the relationship between the opening of the regulating valve and the refrigerant flow ratio.

FIG. 12 shows position relationships between a rotational position of valve body 43 of regulating valve 12 and freezing side valve opening 41 and refrigerating side valve opening 42, and FIG. 13 shows a relationship between a rotational position of valve body 43 of regulating valve 12 and a flow ratio between freezing side valve opening 41 and refrigerating side valve opening 42.

(a) 4-Pulse Position (FIG. 12(a), FIG. 13(a))

During a rapid refrigerating operation, the valve body rotating in the right direction in the drawing is at a 4-pulse position, and refrigerating side valve opening 42 escapes perfectly from thick step 43a of valve body 43 and refrigerating side valve opening 42 is fully opened, and the refrigerant flows only in refrigerating evaporator 5, and the cooling operation is performed only for refrigerating evaporator 5.

(b) 20-Pulse Position (FIG. 12(b), FIG. 13(b))

For example, when both freezing section 2 and refrigerating section 3 are in predetermined cooling temperature states, valve body 43 is at a position of 20 pulses, and freezing side slit 47 does not coincide with freezing side valve opening 41, and refrigerating side slit 48 does not coincide with refrigerating side valve opening 42, and valve openings 41 and 42 to respective freezing evaporator 4 and refrigerating evaporator 5 are fully closed by thick step 43a of valve body 43, and no refrigerant flows, and no cooling operation is performed.

(c) 29-Pulse Position (FIG. 12(c), FIG. 13(c))

When temperature sensor 23 in the freezing chamber detects that the temperature of freezing section 2 rises from a lapse of time or by opening the door of the freezing chamber in the freezing operation stop state, valve body 43 rotates up to the position of 29 pulses, and freezing side slit 47 is interconnected to freezing side valve opening 41, so that the refrigerant flows on the side of freezing evaporator 4 by about 20% of that at time of full opening. At this time, refrigerating side slit 48 and refrigerating side valve opening 42 are not interconnected to each other as before, and no refrigerant is supplied to refrigerating evaporator 5.

(d) 41-Pulse Position (FIG. 12(d), FIG. 13(d))

During the rapid freezing operation, valve body 43 rotates up to the 41-pulse position, and freezing side valve opening 41 escapes perfectly from thick step 43a of valve body 43 and freezing side valve opening 41 is fully opened, so that freezing evaporator 4 and furthermore freezing section 2 can be cooled concentratedly.

(e) 49-Pulse Position (FIG. 12(e), FIG. 13(e))

When the temperature of refrigerating section 3 rises, for example, valve body 43 rotates up to the position of 49 pulses, and the starting end portion of refrigerating side slit 48 is interconnected to refrigerating side valve opening 42, so that a refrigerant flow at a minimum flow ratio of 5% is generated and the cooling operation on the side of refrigerating evaporator 5 is started. At this time, freezing evaporator 4 is also opened fully, and thereby holds the refrigerant flowing-out state.

(f) 62-Pulse Position (FIG. 12(f), FIG. 13(f))

When valve body 43 is at the 62-pulse position, it is in an intermediate state that the intermediate position of the narrow width area of refrigerating side slit 48 is interconnected to refrigerating side valve opening 42, and the refrigerant flow rate to refrigerating evaporator 5 increases linearly, and by smooth flow rate adjustment during this period, the cooling capacity of refrigerating evaporator 5 can be adjusted finely.

(g) 71-Pulse Position (FIG. 12(g), FIG. 13(g))

The ending position of the narrow width area of refrigerating side slit 48 is opposite to refrigerating side valve opening 42, and it is in the ending state that the refrigerant flow rate to refrigerating evaporator 5 increases linearly.

(h) 82-Pulse Position (FIG. 12(h), FIG. 13(h))

When it is necessary to simultaneously cool both freezing evaporator 4 and refrigerating evaporator 5, valve body 43 rotates up to the 82-pulse position, and both freezing side slit 47 and refrigerating side slit 48 escape from thick step 43a of valve body 43, and both valve openings 41 and 42 are fully opened, so that freezing evaporator 4 and refrigerating evaporator 5 are simultaneously supplied with the refrigerant and are subject to the cooling operation.

In this case, as shown in FIG. 13, the reason that an area (indicated by an arrow B in the drawing) where the refrigerant flow ratio to freezing evaporator 4 is fixed such as about 20% is provided is to guarantee that when valve body 43 is at the 29-pulse position, regardless of a displacement of valve body 43, the refrigerant flow ratio to freezing evaporator 4 is set to about 20%. Further, until the refrigerant flow ratio to refrigerating evaporator 5 becomes 71 pulses, the rise of the flow ratio according to the rise of the rotation of valve body 43 is slow, while at the rotational position where the number of pulses is more than 71, the flow ratio according to the rise of the rotation of valve body 43 rises suddenly. Namely, under the control for the refrigerant flow ratio to freezing evaporator 4, it means that valve body 43 of regulating valve 12, when positioned at the number of pulses of 71, has an inflection point (indicated by an arrow C in FIG. 13). The reason is that to execute a finer control for the refrigerant flow rate, it is desirable to increase the number of pulses in the limiting area (the number of pulses of 45 to 71) shown in FIG. 13 and to reduce an adjustment amount of the refrigerant flow rate per pulse, though the number of pulses for allowing valve body 43 to make one revolution is restricted, and it is difficult to increase the number of pulses.

Here, perceiving that the reason that the finer adjustment of the refrigerant flow rate to refrigerating evaporator 5 is necessary is that the refrigerant flow rate is within a small range, the flow path of valve body 43 is devised, and thus when valve body 43 is within a range from 45 pulses to 71 pulses, an increasing change amount of the refrigerant flow rate per pulse of valve body 43 is suppressed, and when it is within a range from 71 pulses to 82 pulses, an increasing change amount of the refrigerant flow rate per pulse is increased.

Further, when the rotational position of valve body 43 of regulating valve 12 is between 45 and 53 pulses, the area of the valve opening to refrigerating evaporator 5 is a minimum area of the limiting area, though the minimum area, for example, is set to be larger than any areas of foreign substances passing through a strainer installed in compressor 9. The reason is that during the freezing cycle, when foreign substances, for example, metallic powders when the refrigerant pipes is cut off or scales during welding are contained, there is a fear that the minimum flow path may be clogged with those foreign substances, though the minimum area is set larger than foreign substances passing through the strainer, thus refrigerating side valve opening 42 to refrigerating evaporator 5 of regulating valve 12 can be prevented from being clogged with foreign substances.

In this embodiment, as shown in FIG. 12, freezing side valve opening 41 is almost fixed to be fully opened or fully closed, and the flow ratio to refrigerating side valve opening 42 is changed by refrigerating side slit 48, and thus the refrigerant flow rate is adjusted linearly within the range from 49 to 71 pulses.

Further, as for freezing side capillary tube 15 and refrigerating side capillary tube 16 in freezing cycle device 10, to make the refrigerant evaporation temperatures in freezing evaporator 4 and refrigerating evaporator 5 different from each other, the limiting of freezing side capillary tube 15 is increased, thus as described above, when the refrigerant flows into both freezing evaporator 4 and refrigerating evaporator 5, there is a tendency for the refrigerant to inevitably flow easily into refrigerating evaporator 5 having a small resistance but to flow hardly into freezing evaporator 4, and in an extreme case, the situation that no refrigerant flows into freezing evaporator 4 occurs.

To improve it, in regulating valve 12, along with the refrigerant flow control for cooling freezing section 2 and refrigerating section 3, and to prevent a so-called one-sided flow of the refrigerant, a control is added for limiting the refrigerant flow rate to refrigerating evaporator 5 which is made to realize easy flow of the refrigerant.

Further, the refrigerant flowing into regulating valve 12 is the refrigerant condensed by condenser 11 and includes both a gas refrigerant and a liquid refrigerant, and when it flows into regulating valve 12 the flow speed is decreased, so that the liquid refrigerant is apt to be collected under regulating valve 12. Therefore, when the valve seat of regulating valve 12 is not horizontal, at the valve opening positioned downward, the liquid ratio of the refrigerant is increased. In this embodiment, it is a basis to control the refrigerant flow rate to refrigerating evaporator 5, so that when refrigerating side valve opening 42 is at a higher position than freezing side valve opening 41, the gas refrigerant whose flow rate cannot be controlled increases in quantity and the refrigerant distribution by valve body 43 cannot be controlled.

Figure 14:
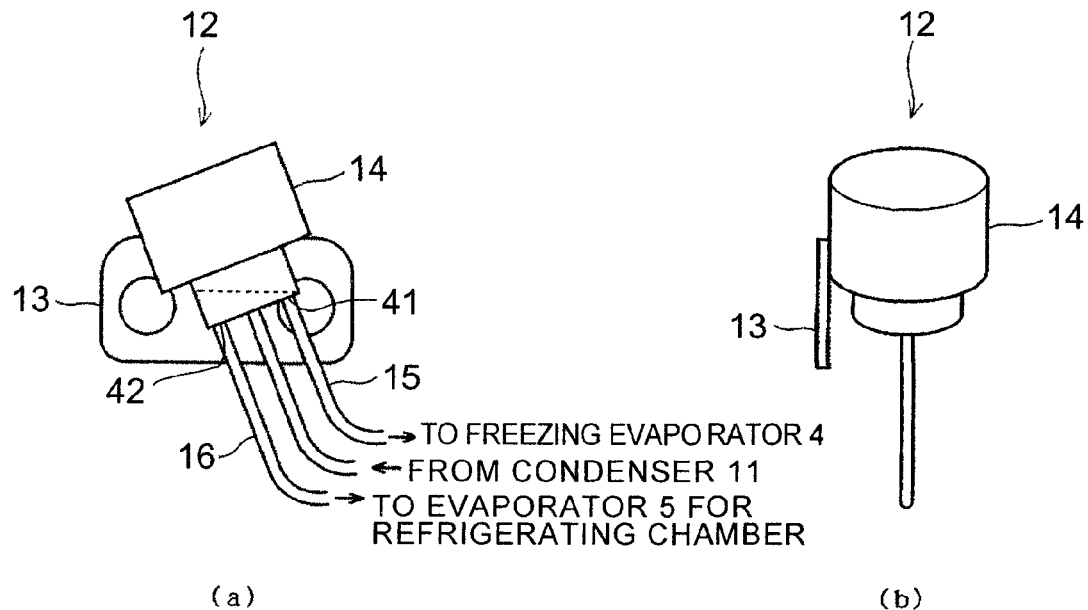
FIGS. 14(a) and 14(b) are a front view of the regulating valve and a side view thereof, respectively.

Therefore, in this embodiment, as shown in FIG. 14, regulating valve body 14 is integrally installed so as to incline to a fixture 13, and when fixture 13 is attached in a horizontal position, refrigerating side valve opening 42 is positioned under freezing side valve opening 41. By use of such a constitution, a ratio of the liquid refrigerant collected in refrigerating side valve opening 42 can be made higher than that of freezing side valve opening 41, and the refrigerant flow ratio to refrigerating evaporator 5 can be controlled.

On the other hand, for the opening control for the valve opening of regulating valve 12, various patterns can be selected such that for the valve flow ratio to freezing evaporator 4 and refrigerating evaporator 5, both valve openings are opened fully or closed fully, or freezing side valve opening 41 is limited and refrigerating side valve opening 42 is opened fully, or refrigerating side valve opening 42 is limited and freezing side valve opening 41 is opened fully. However, in this embodiment, freezing evaporator 4 and refrigerating evaporator 5 are connected in parallel, and under the ordinary control, in the state that freezing side valve opening 41 is opened fully and refrigerating side valve opening 42 is limited and adjusted.

In this case, when freezing side valve opening 41 is opened fully, without affected by the refrigerant flow rate by the limiting adjustment of refrigerating side valve opening 42, freezing side evaporator 4 can obtain almost predetermined freezing capacity, and with respect to the cooling capacity of refrigerating evaporator 5, a predetermined cooling capacity can be obtained by the limiting adjustment of refrigerating side valve opening 42 and the adjustment of the number of revolutions of compressor 9.

Namely, the refrigerant flowing out from freezing side valve opening 41 is decompressed when passing through freezing side capillary tube 15 set so as to be made equal to an evaporation temperature conforming to a cooling temperature in freezing section 2, and evaporates in freezing evaporator 4, for example, at about −25° C. Similarly, the refrigerant flowing out from refrigerating side valve opening 42 is decompressed when passing through refrigerating side capillary tube 16 set so as to be made equal to an evaporation temperature conforming to a cooling temperature in refrigerating section 3, and evaporates in refrigerating evaporator 5, for example, at about −5° C.

Figure 15:
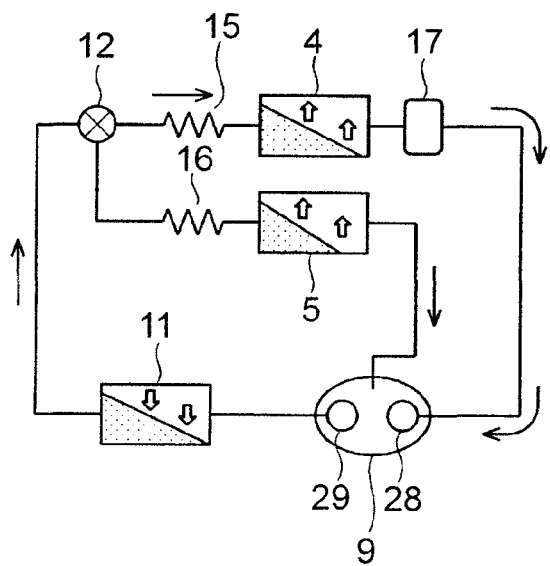
FIG. 15 is a schematic view showing the flow of the refrigerant in the freezing cycle of the another embodiment of the present invention.

Next, an operation of freezing cycle device 10 will be explained by referring to FIG. 15. When compressor 9 is driven by turning on the power source, the compressed gas refrigerant which is at high temperature and high pressure is discharged to condenser 11, is liquefied therein, and then is sent to regulating valve 12. Regulating valve 12, as described above, can be set various patterns. Though, when the power source is turned on, freezing section 2 and refrigerating section 3 are not cooled yet, so that both valve openings 41 and 42 are opened fully, and the refrigerant flows into freezing side capillary tube 15 and refrigerating side capillary tube 16, is decompressed therein, flows into freezing evaporator 4 and refrigerating evaporator 5, evaporates at respective evaporation temperatures (for example, about −25° C. and about −5° C.), and cools sections 2 and 3 to predetermined temperatures.

At this time, to remove the one-sided flow of the refrigerant to refrigerating evaporator 5 due to the difference in flow path resistance between capillary tubes 15 and 16 for forming the evaporation temperature difference as mentioned above, regulating valve 12, by slightly limiting the refrigerant flow rate to refrigerating evaporator 5 realizing an easy flow of the refrigerant, controls so as to hold both the refrigerant flow rates to freezing evaporator 4 and refrigerating evaporator 5 in the well-balanced state.

The refrigerant from freezing evaporator 4 flows into accumulator 17, and when the liquid refrigerant not evaporated remains in the refrigerant from freezing evaporator 4, it is stored in accumulator 17, and only the gas refrigerant is sucked into low-pressure stage side compression section 28 of compressor 9 from freezing side suction pipe 18. Further, the gas refrigerant evaporated in refrigerating evaporator 5 is introduced into closed case 30 at an intermediate pressure of compressor 9 via refrigerating side suction pipe 19.

The gas refrigerant sucked into low-pressure stage side compression section 28 of compressor 9 from freezing evaporator 4, is compressed therein, and is discharged into closed case 30 joins the gas refrigerant flowing into the intermediate pressure space of closed case 30 from refrigerating evaporator 5, and the joined refrigerant is sucked into high-pressure stage side compression section 29, is compressed therein, and is discharged to condenser 11, and thus the freezing cycle is formed.

Therefore, according to freezing cycle device 10 having the aforementioned constitution, freezing evaporator 4 and refrigerating evaporator 5 respectively having capillary tubes 15 and 16 for obtaining the evaporation temperatures in accordance with the set temperatures of freezing section 2 and refrigerating section 3 are installed, so that as compared with the constitution which by use of a single-stage compressor, confined to the pressure of freezing evaporator 4, is difficult to provide a difference in the evaporation temperatures, refrigerating side suction pipe 19 from refrigerating evaporator 5 is connected to the intermediate pressure space in closed case 30 of compressor 9, and thus the evaporation temperature of refrigerating evaporator 5 can be made higher than that of freezing evaporator 4 in response to an inner cooling temperature thereof, and since the input load of compressor 9 is reduced, the freezing cycle efficiency is increased, and the power consumption can be reduced.

Here, the distribution of the refrigerant flow rates is executed by obtaining a difference between the detected temperatures of exit temperature sensors 26 and 27 attached to the exit pipe and the entrance pipe of refrigerating evaporator 5.

Namely, when the load is high, the heat exchange quantity is increased, and a flow rate of the refrigerant flowing in refrigerating evaporator 5 is reduced, the refrigerant is all evaporated in refrigerating evaporator 5, and the refrigerant state at the exit pipe of refrigerating evaporator 5 is composed of only a gas refrigerant, and is put into a superheat condition (a superheat condition) free of a liquid refrigerant, so that the temperature difference between the exit and the entrance of refrigerating evaporator 5 is increased.

Here, in order that a difference between the exit temperature and the entrance temperature of the refrigerating evaporator (hereinafter, referred to as a superheat amount) is set to a predetermined temperature, for example, 4° C., the opening of regulating valve 12 is controlled so as to obtain a predetermined superheat amount, thus compressor 9 is prevented from a liquid back, and the refrigerant distribution during the freezing cycle can be rationalized. And, when the superheat amount becomes, for example, higher than 5° C., the superheat condition of refrigerating evaporator 5 is judged to be excessive, and the refrigerant distribution to refrigerating evaporator 5 is increased to increase the flow rate, and the refrigerant in refrigerating evaporator 5 is put into the two-phase state of gas and liquid, and thus the heat exchange performance in refrigerating evaporator 5 can be retained. Further, when the superheat amount becomes, for example, 3° C. or lower, the superheat condition of refrigerating evaporator 5 is judged to be insufficient, and the refrigerant distribution to refrigerating evaporator 5 is decreased to reduce the flow rate, and the refrigerant in refrigerating evaporator 5 is put into the two-phase state of gas and liquid, and thus compressor 9 can be prevented from a liquid back.

Next, an operation of controller 22 of the another embodiment of the present invention will be indicated. Here, controller 22 executes a control of the ordinary freezing cycle operation, additionally executes a superheat control relating to this embodiment, and also executes simultaneously other controls, and those controls will be explained by referring to flow charts or timing charts.

(Superheat Control (Basis))

Firstly, a superheat control (basis) according to the another embodiment of the present invention will be explained.

Figure 16:
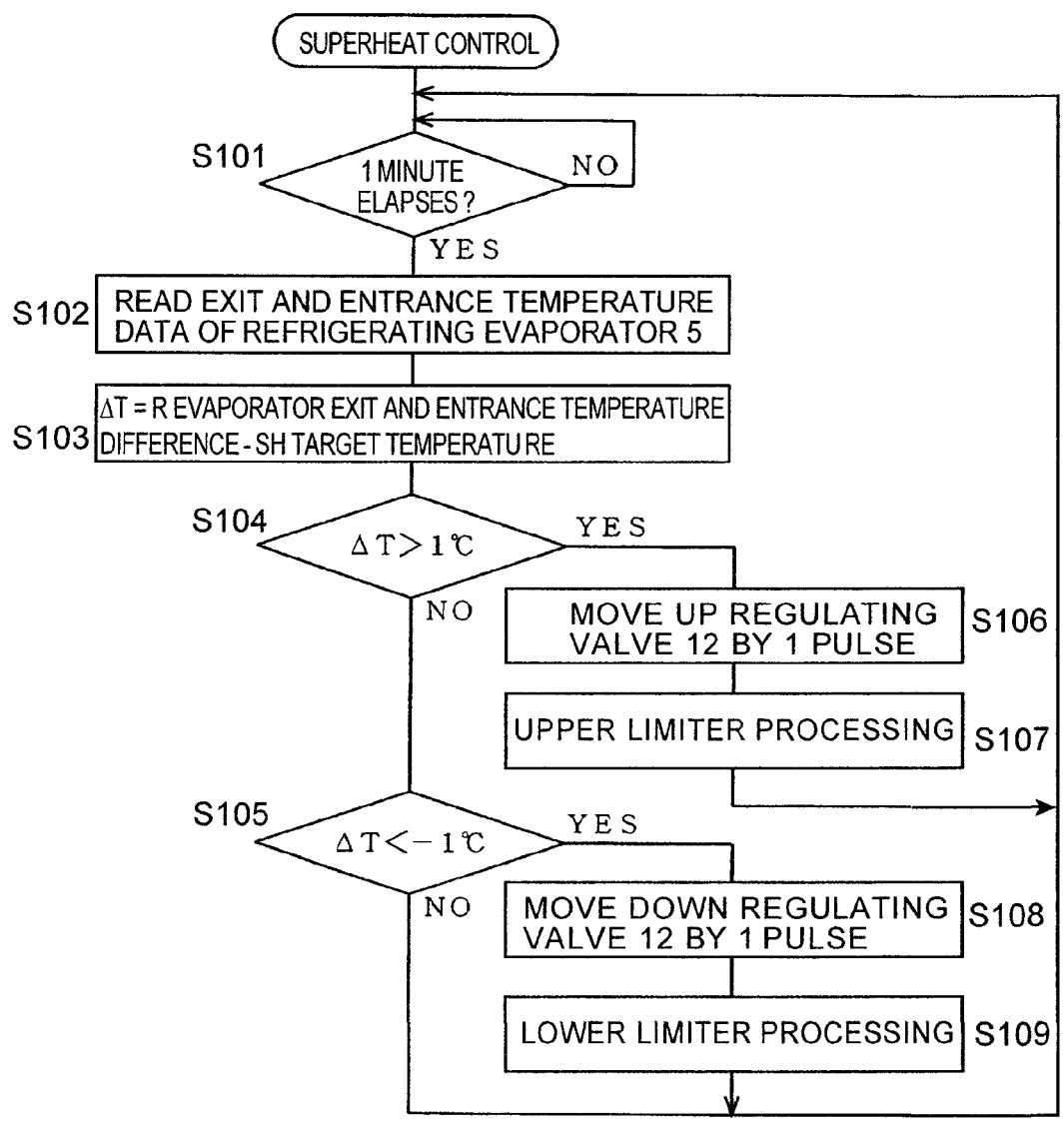
FIG. 16 is a flow chart (No. 1) showing a superheat control of the controller of the another embodiment of the present invention.

FIG. 16 shows schematically the basis of the superheat control by controller 22. As shown in FIG. 16, controller 22, when one minute elapses (YES at a Step S101), (Note: Name (Step) is added to S101 as Step S101, the same may be said with the following, Name (Step) may be given from the beginning) reads an exit and an entrance temperature data of refrigerating evaporator 5 (a Step S102), obtains a superheat amount from the temperature difference (the exit temperature—the entrance temperature), and obtains a difference ΔT between the superheat amount and a superheat target temperature (set at 4° C. in this embodiment) (a Step S103). And, it is judged whether difference ΔT obtained in this way is 5° C. which is higher than the target superheat amount by 1° C., or higher in expectation of an error (a Step S104) or it is 3° C. which is lower than the target superheat amount by 1° C., or lower (a Step S105). Here, when the superheat amount is between 3° C. and 5° C., it is judged that the superheat amount of refrigerating evaporator 5 is appropriate and the process returns to Step S101 without doing anything. On the other hand, when the superheat amount is 5° C. or higher (YES at Step S104), it is judged that the superheat amount of refrigerating evaporator 5 is large and the refrigerant flow rate is insufficient, and the rotational position of valve body 43 of regulating valve 12 is raised by one pulse (a Step S106, refer to FIG. 17). By doing this, the flow ratio to refrigerating evaporator 5 at regulating valve 12 is increased, so that the refrigerant flow rate to refrigerating evaporator 5 is increased.

This control for increasing the refrigerant flow rate is executed every one minute when the superheat amount is 5° C. or higher, and in this control state, refrigerating side valve opening 42 of regulating valve 12 opens slowly, and the refrigerant flow rate increases slowly, though when the rotational position of valve body 43 reaches 60 pulses, it is judged by an upper limiter process (a Step S107) that the refrigerant supply amount is at its upper limit, and the rise of pulses is prohibited even if the superheat amount is 5° C. or higher.

Figure 17:
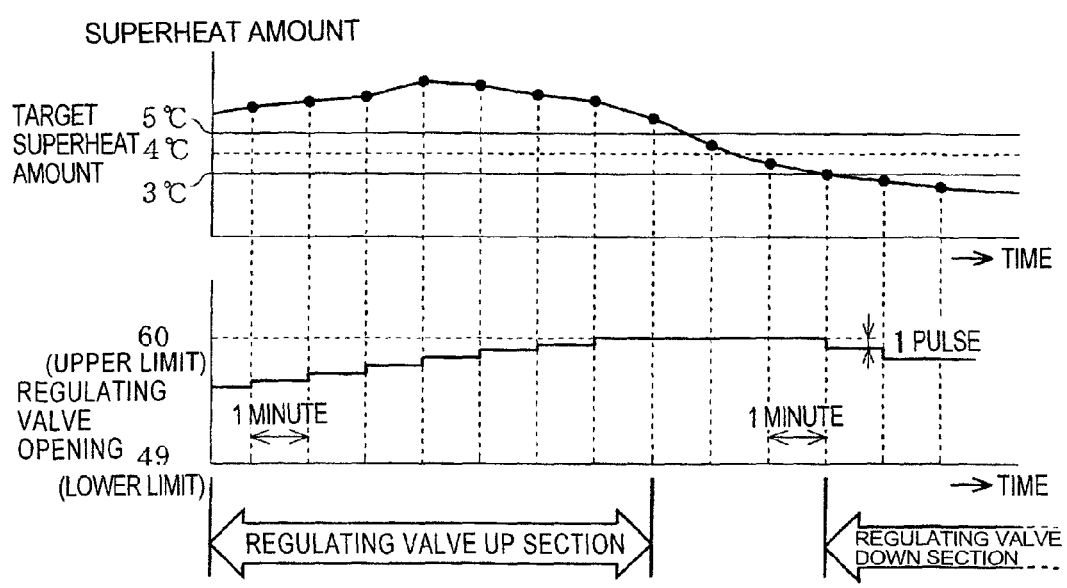
FIG. 17 is a drawing showing a relationship between an opening of the regulating valve and a superheat amount of the refrigerating evaporator under the control shown in FIG. 16.

By the aforementioned operation, as shown in FIG. 17, the superheat amount is prevented from rising, is lowered, and finally becomes lower than 5° C., and thus the control for regulating valve 12 is stopped. In this case, when the superheat amount is in the ordinary state of 3° C. to 5° C., the rotational position of the valve body of regulating valve 12 is ordinarily set at 60 pulses, and the refrigerant supply to refrigerating evaporator 5 is maximized in the limited area, so that as shown in FIG. 17, the superheat amount becomes 3° C. or lower.

Here, the reason that as for the rotational position of valve body 43 of regulating valve 12 an upper limit is set at of 60 pulses is that, as described above, when the superheat amount of refrigerating evaporator 5 is large, the opening of the valve body of regulating valve 12 is increased, and the refrigerant flow rate to refrigerating evaporator 5 is increased, thus the superheat amount is controlled so as to be reduced, though as a characteristic of the freezing cycle, at an early stage of starting to flow the refrigerant, the temperature of refrigerating evaporator 5 is high, so that the refrigerant flowing into refrigerating evaporator 5 evaporates in the neighborhood of the entrance. Therefore, a behavior appears that the superheat amount of refrigerating evaporator 5 is kept in the large state and thereafter, it is reduced is shown. Namely, the response of the freezing cycle is slow, so that even if the opening of valve body 43 of regulating valve 12 is increased, the superheat amount is kept in the large state, and thus the operation of additionally increasing the opening of valve body 43 is continued. In this state, the superheat amount of freezing evaporator 4 is reduced, and when next decreasing the opening of valve body 43, the opening of valve body 43 is large excessively, so that faults may be caused such that a period of time is taken to suppress the supply of refrigerant to freezing evaporator 4 and the refrigerant flows out from freezing evaporator 4 in the liquid state. Therefore, an upper limit is provided on the opening of the valve body of regulating valve 12, and thus the superheat amount is prevented from excessive overshooting.

On the other hand, controller 22, when the superheat amount is 3° C. or lower (YES at Step S105), moves down valve body 43 of regulating valve 12 by one pulse (a Step S108, refer to FIG. 17). By doing this, as the flow ratio to refrigerating evaporator 5 in regulating valve 12 is reduced, the refrigerant flow rate to refrigerating evaporator 5 is reduced.

This control for decreasing the refrigerant flow rate is executed every one minute when the target superheat amount is 3° C. or lower, and in this control state, the opening of refrigerating side valve opening 42 of regulating valve 12 is reduced, and the refrigerant flow rate is reduced slowly, so that the evaporation of the refrigerant by refrigerating evaporator 5 is promoted, thus the superheat amount is increased.

Under the aforementioned control, on the basis of the difference between the superheat amount and the target superheat amount of 4° C., the refrigerant flow rate to refrigerating evaporator 5 is limited and adjusted by controller 22, so that the superheat amount varies across the target superheat amount of 4° C., and thus the superheat amount of refrigerating evaporator 5 can be adjusted appropriately.

On the other hand, the operation condition of freezing cycle device 10 is greatly affected by the environment, so that depending on the environment, the valve body of regulating valve 12 may be controlled to a lower limit position of 49 pulses, and when the rotational position of valve body 43 reaches 49 pulses, by a lower limiter process (a Step S109), the descent of pulses is prohibited even if the superheat amount is 3° C. or lower.

When valve body 43 of regulating valve 12 is controlled to the lower limit position like this, the refrigerant flow rate is lowered extremely, so that a fear may be caused that due to a slight displacement of valve body 43 or variations in the shape of valve body 43, the refrigerant flow rate to refrigerating evaporator 5 is varied greatly from the target refrigerant flow rate.

However, in this embodiment, when valve body 43 of regulating valve 12 is at the lower limit position, the refrigerant flow ratio is kept at 5% of that at that time of full opening, so that under the ordinary control, in the limited area of the refrigerant to freezing evaporator 4, the superheat condition of freezing evaporator 4 can be controlled appropriately.

Further, regulating valve 12, to prevent refrigerant leakage, a magnet coupling for driving a rotor installed in a closed container by a stator outside the container is used, and the stator position is controlled in an open loop in such circumstances, so that a stepping motor is used generally. Therefore, when the rotational direction of the valve body is changed a hysteresis may be caused that valve body 43 does not move due to a minute play between the rotor and valve body 43, or as there is a deviation in combination of the stator and the container, a shift may be caused between the number of steps sent to the stepping motor and the position of valve body 43. However, in this embodiment, a limiting condition, that is, an area where the refrigerant flow ratio is not changed is provided, thus a fixed flow ratio can be obtained surely.

(Superheat control (refrigerant flow rate restriction control 1))

Next, a superheat control (a refrigerant flow rate restriction control 1) according to the another embodiment of the present invention will be explained.

Figure 18:
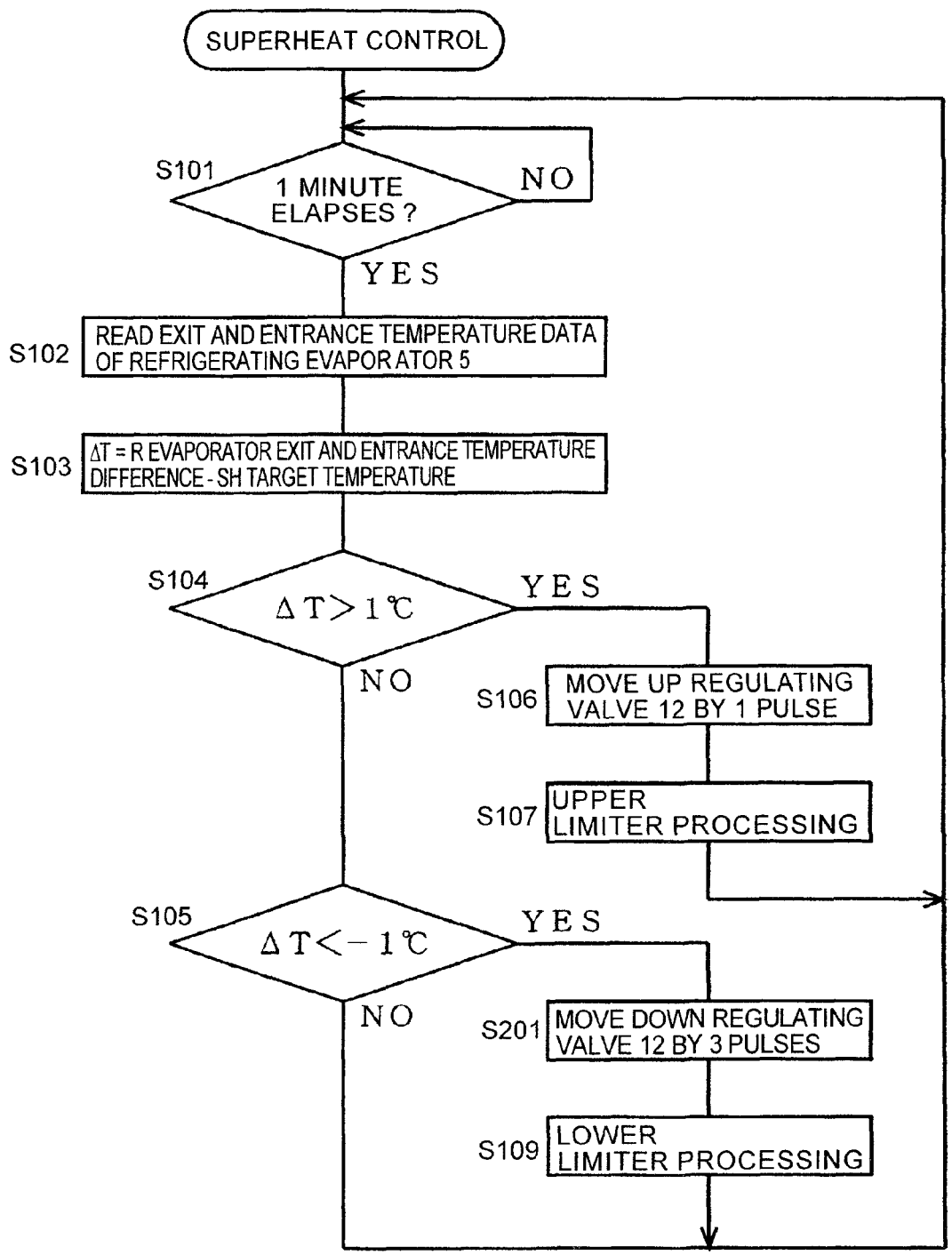
FIG. 18 is a flow chart (No. 2) showing a superheat control of the controller of the another embodiment of the present invention.

When limiting the opening of regulating valve 12, thereby reducing the refrigerant flow rate to refrigerating evaporator 5, as shown in FIG. 18, it is desirable to control the descending amount of regulating valve 12 to, for example, 3 pulses (a Step S201).

A flow chart shown in FIG. 18 is characterized in that in the flow chart shown in FIG. 16, Step S108 is replaced with Step S201.

Here, as for the reason that the descending speed (3 pulses per minute) of the refrigerant flow rate to refrigerating evaporator 5 is set higher than the ascending speed (1 pulse per minute) of the refrigerant flow rate thereof, a behavior is shown that as a characteristic of the freezing cycle, at an early stage of the start of flowing the refrigerant, the temperature of refrigerating evaporator 5 is high, so that the refrigerant flowing into refrigerating evaporator 5 evaporates in the neighborhood of the entrance and is superheated at the exit, and thereafter the exit temperature is lowered. At this time, a phenomenon appears that, even if the opening of refrigerating side valve opening 42 of regulating valve 12 is limited, it is used together with refrigerating side capillary tube 16, so that a time lag is caused, and the limiting of refrigerating side valve opening 42 is insufficient.

Figure 19:
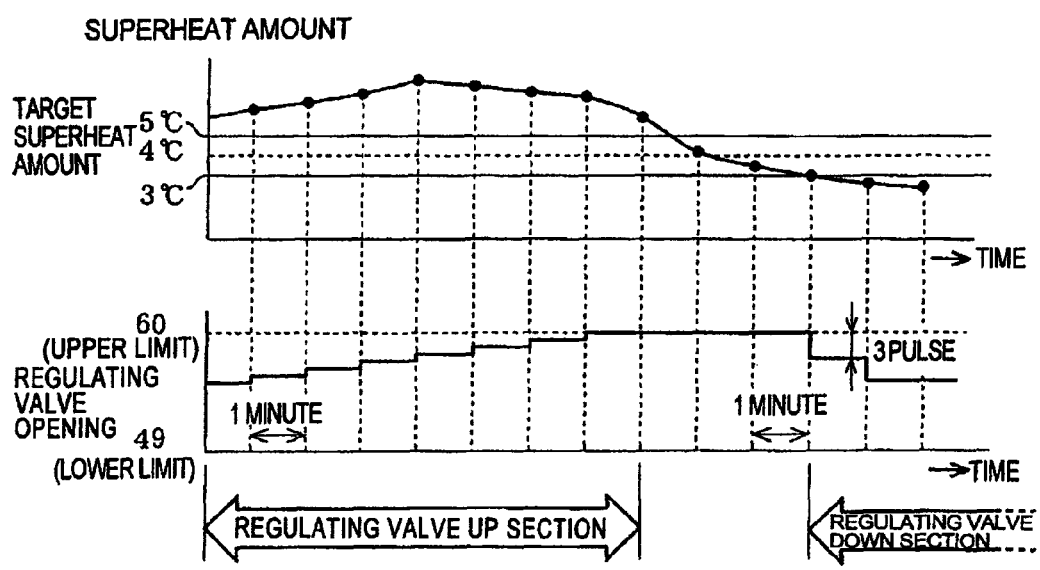
FIG. 19 is a drawing showing a relationship between an opening of the regulating valve and a superheat amount of the refrigerating evaporator under the control shown in FIG. 18.

By the aforementioned operation, as shown in FIG. 19, the descending speed of the superheat amount is suppressed, and then is increased, and when the superheat amount finally exceeds 3° C., the control for regulating valve 12 is stopped.

Therefore, under such superheat control, the limiting amount of the refrigerant flow rate to refrigerating evaporator 5 can be increased, so that refrigerating evaporator 5 can be responded to a stop lag of the refrigerant supply thereto.

(Superheat Control (Refrigerant Flow Rate Restriction Control 2))

Next, a superheat control (a refrigerant flow rate restriction control 2) according to the another embodiment of the present invention will be explained.

As a method for limiting the opening of regulating valve 12, and thereby reducing the refrigerant flow rate to refrigerating evaporator 5, a control interval for reducing the refrigerant flow rate may be shortened.

Figure 20:
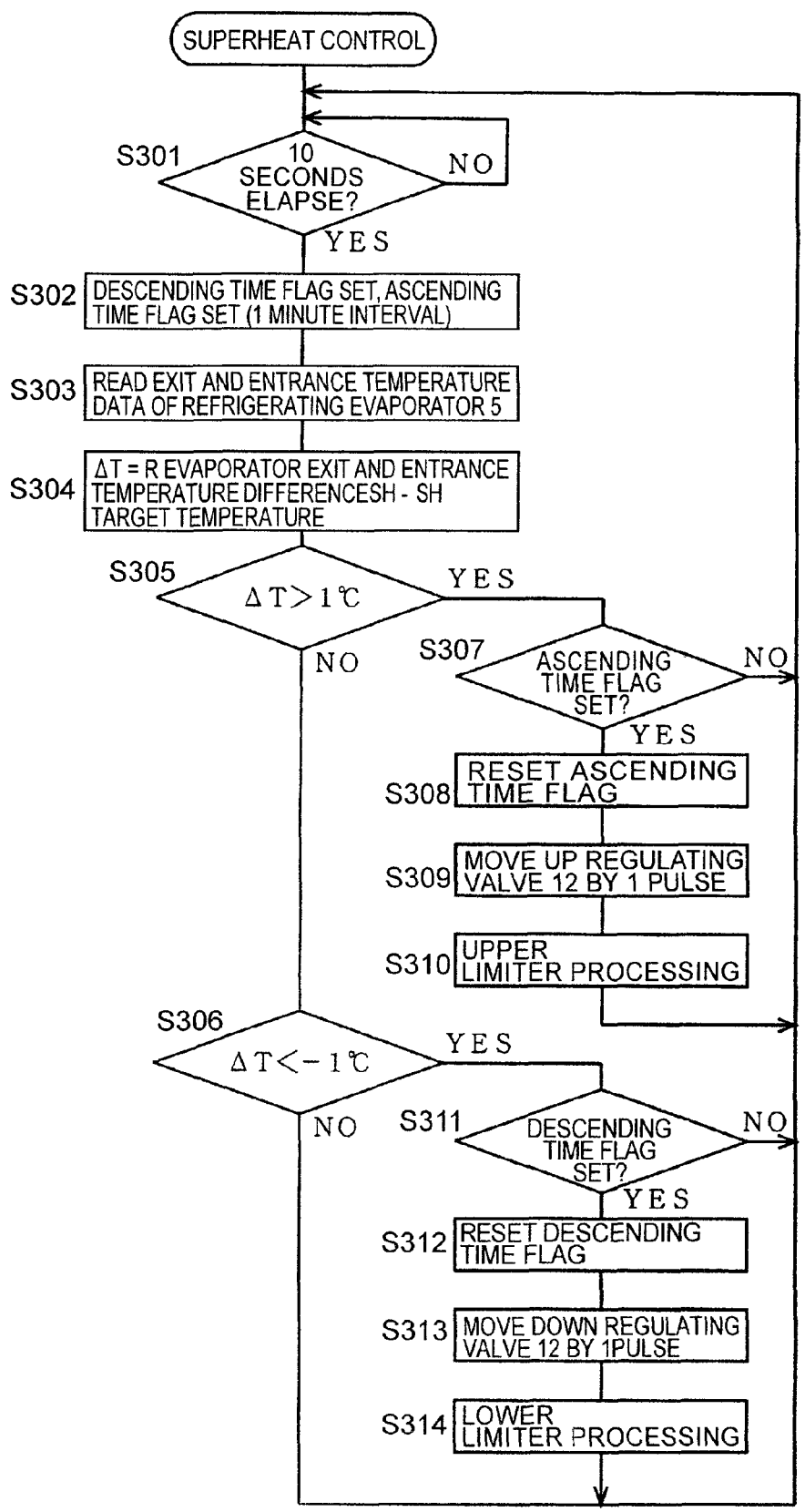
FIG. 20 is a flow chart (No. 3) showing a superheat control of the controller of the another embodiment of the present invention.

Namely, as shown in FIG. 20, controller 22, when 10 seconds elapse (YES at a Step S301), sets a descending time flag, sets an ascending time flag every one minute, that is, at a rate of once per 6 times (a Step S302), and similarly to the superheat control aforementioned, controls the superheat amount to the target superheat amount (when moving up the valve body of regulating valve 12 by one pulse, every one minute).

Here, the contents at a Step S303, a step S304, a Step S305, and a Step S306 are respectively the same as the contents at Step S102, Step S103, Step S104, and Step S105 shown in FIG. 16.

Here, controller 22, when the superheat amount is 5° C. or higher (YES at Step S305), confirms whether the ascending time flag is set or not (a Step S307), when it is set (YES at Step S307), that is, when one minute elapses, resets the ascending time flag (a Step S308), and moves up valve body 43 of regulating valve 12 by one pulse (a Step S309). By doing this, similarly to the control shown in FIG. 16, the refrigerant flow ratio to refrigerating evaporator 5 is increased, so that the refrigerant flow rate to refrigerating evaporator 5 is increased.

Further, controller 22, when the superheat amount is 3° C. or lower (YES at Step S306), confirms whether the descending time flag is set or not (a Step S311), when it is set (YES at Step S311), that is, when 10 seconds elapse, resets the descending time flag (a Step S312), and moves down valve body 43 of regulating valve 12 by one pulse (a Step S313). By doing this, the refrigerant flow ratio to refrigerating evaporator 5 is reduced, so that the refrigerant flow rate to refrigerating evaporator 5 is reduced.

Further, the contents at other Step S310 and Step S314 are respectively the same as the contents at Step S107 and Step S109 shown in FIG. 16.

Such control for reducing the refrigerant flow rate, as shown in FIG. 21, is executed every 10 seconds when the target superheat amount is 3° C. or lower, and in this control state, the refrigerant flow rate to refrigerating evaporator 5 is reduced slowly, so that the evaporation of the refrigerant by refrigerating evaporator 5 is promoted, and the superheat condition of refrigerating evaporator 5 is promoted, and the superheat amount is increased.

Therefore, the limiting amount of the refrigerant supply to refrigerating evaporator 5 can be increased, so that refrigerating evaporator 5 can be responded to a stop lag of the refrigerant supply thereto.

(Upper Limit Value Changing Control)

Next, an upper limit value changing control according to the another embodiment of the present invention will be explained.

In this embodiment, the refrigerant flow ratio to refrigerating evaporator 5 is controlled by the opening of regulating valve 12, so that due to the flow of the refrigerant into refrigerating side valve opening 42 having a very small flow path area, a pressure loss is caused. Therefore, when the refrigerant flow rate is high, that is, when the number of revolutions of compressor 9 is large, the resistance is increased, and as the number of revolutions of compressor 9 is increased, the efficiency of freezing cycle device 10 is lowered due to the pressure loss.

Therefore, controller 22, as shown in FIG. 22, if the room temperature is 20° C. which is the normal temperature or higher, when the number of revolutions of compressor 9 is large (for example, 60 Hz or more), increases the upper limit value, and when the number of revolutions is small (for example, 40 Hz or less), lowers the upper limit value, thereby prevents a fault that when the refrigerant flow rate is high, the opening is limited too much and when it is low, the opening is opened too much, and executes appropriately the limiting adjustment.

In this case, if the room temperature is lower than 20° C. which is judged as a medium room temperature or a low room temperature, when the upper limit value is similarly increased according to the number of revolutions of compressor 9, the refrigerant supply amount to refrigerating evaporator 5 is excessive, and thereby there is a fear that a fault may be caused, so that when the room temperature is low, the change in the upper limit value according to the number of revolutions of compressor 9 is not executed.

Further, the cooling capacity of the freezing cycle is greatly affected by the room temperature of the installation location of the refrigerator, and when the room temperature is low, the load of the freezing cycle is low, and the refrigerant amount in refrigerating evaporator 5 is rather excessive, so that if the upper limiter control aforementioned is executed when the room temperature is low, the refrigerant amount in refrigerating evaporator 5 is excessive and there is a fear of a liquid back to compressor 10.

Therefore, controller 22, as shown in FIG. 22, when the air temperature is, for example, 11° C. or lower which is judged as a low room temperature, lowers the upper limit value from general 60 pulses to 53 pulses, and restricts the maximum refrigerant supply amount to refrigerating evaporator 5 lower than usual.

In addition to the superheat control aforementioned, various controls sre executed, and thus the superheat amount to refrigerating evaporator 5 is adjusted appropriately, and not only the cooling action of refrigerating evaporator 5 but also the cooling action of freezing evaporator 4 can be fulfilled effectively.

(Return Control 1)

Next, a return control 1 according to the another embodiment of the present invention will be explained.

Meanwhile, by the aforementioned limiting adjustment of the refrigerant flow rate to refrigerating evaporator 5, the superheat amount of refrigerating evaporator 5 can be controlled appropriately, though when refrigerating side valve opening 42 is fully limited to the lower limit of 49 pulses, no refrigerant is supplied to refrigerating evaporator 5, so that the superheat amount of refrigerating evaporator 5 becomes excessively large, and thereafter, if the refrigerating side valve opening 42 is opened slowly, a period of time takes for the refrigerant to flow up to the exit of refrigerating evaporator 5, and a period of time is needed to reduce the superheat amount of refrigerating evaporator 5 to the target superheat amount.

Therefore, in this embodiment, the return control is executed simultaneously with the superheat control aforementioned, and thus the refrigerant is rapidly supplied to refrigerating evaporator 5.

Figure 23:
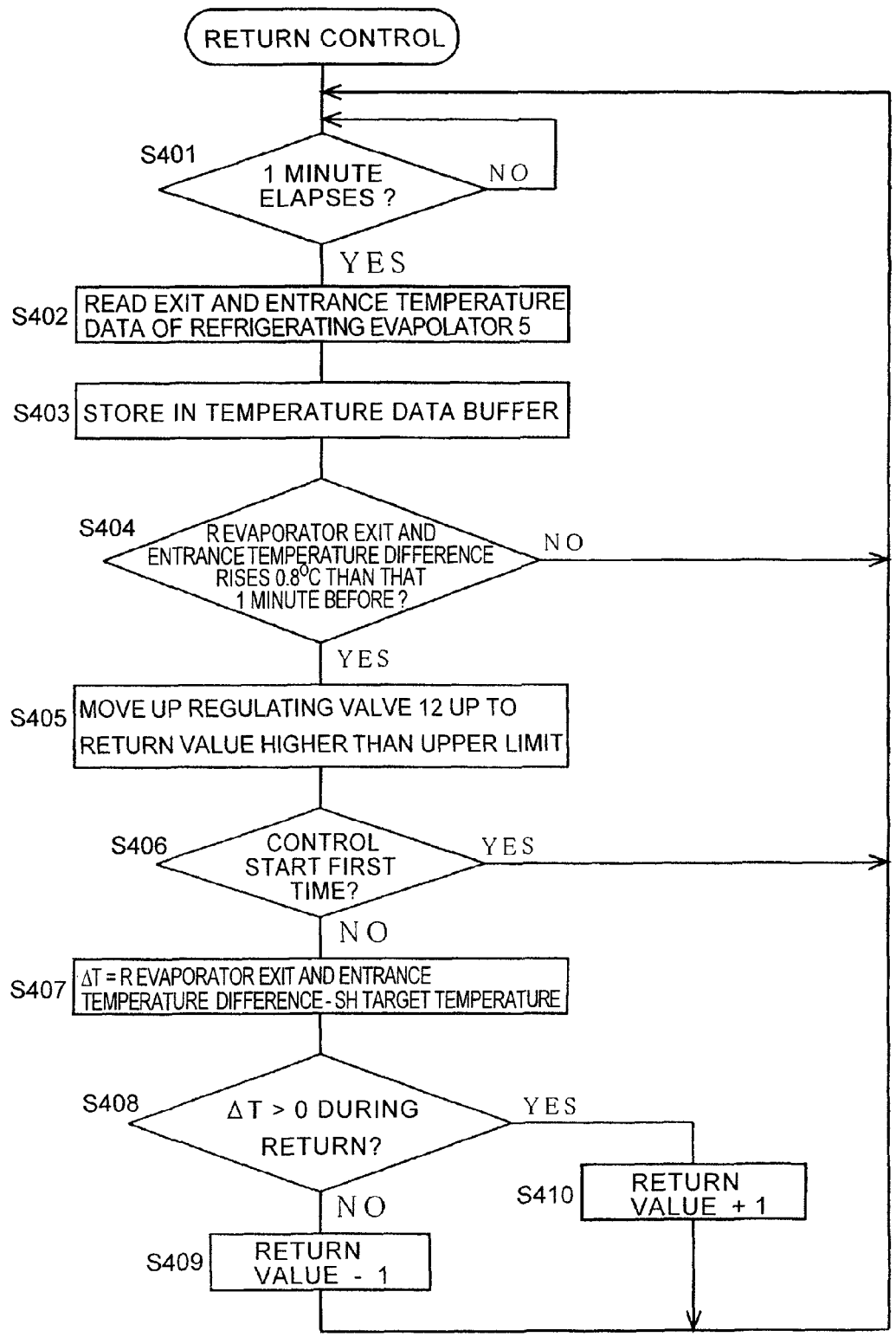
FIG. 23 is a flow chart showing a return control of the controller of the another embodiment of the present invention.

FIG. 23 shows a return control by controller 22. The return control is executed in parallel with the superheat control aforementioned, though when executing both the controls simultaneously, the return control is executed in priority.

In FIG. 23, controller 22, at every lapse of one minute (YES at a Step S401), reads the temperature data at the exit and the entrance of refrigerating evaporator 5 (a Step S402). These operations serve also as the operation of the superheat control aforementioned.

Then, controller 22 stores the read temperature data in a temperature data buffer installed therein (a Step S403), and judges whether or not the temperature difference between the exit and the entrance of refrigerating evaporator 5 rises by 0.8° C. compared with that before one minute (a Step S404). At this time, if the refrigerant flow rate to refrigerating evaporator 5 becomes insufficient as a result of the reduction in the refrigerant supply amount to refrigerating evaporator 5, the exit temperature of refrigerating evaporator 5 rises, and the difference from the entrance temperature rises suddenly, and in correspondence with it, the superheat amount rises suddenly.

Figure 24:
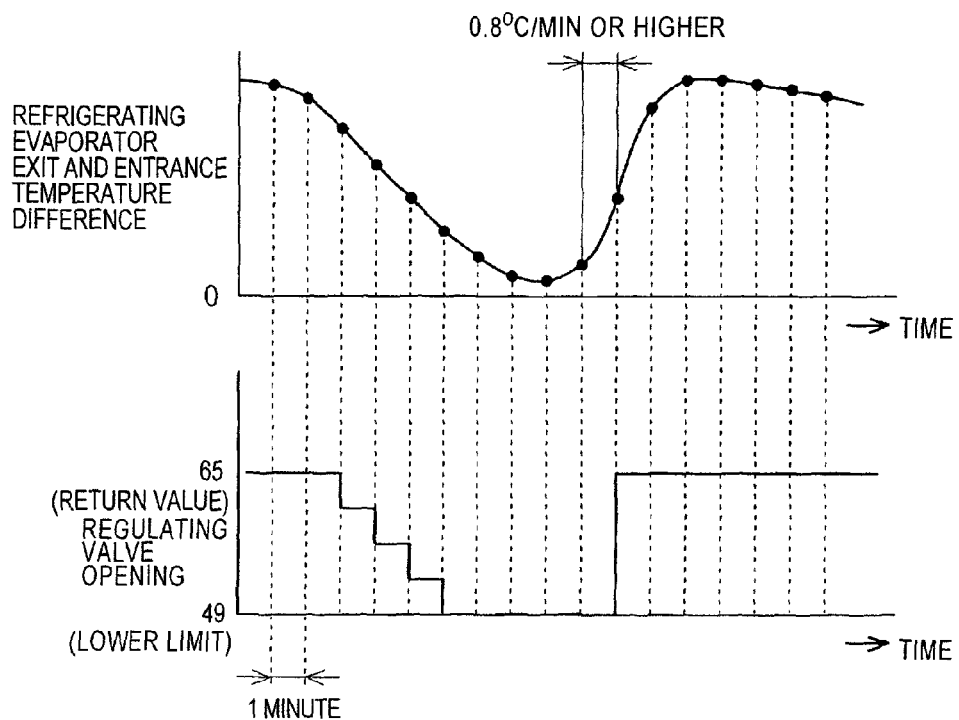
FIG. 24 is a drawing showing a relationship between an opening of the regulating valve and an exit temperature of the refrigerating evaporator under the return control.
Figure 25:
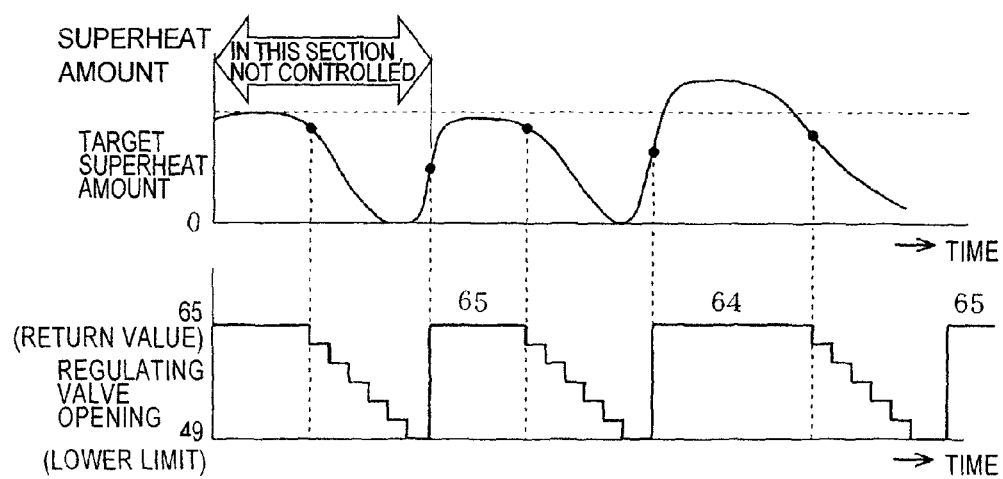
FIG. 25 is a drawing showing a relationship between an opening of the regulating valve and a superheat amount of the refrigerating evaporator under the return control.

And, as shown in FIG. 24, when the temperature difference between the exit and the entrance of the refrigerating evaporator rises by 0.8° C. compared with that before one minute (YES at Step S404), regulating valve 12 is raised up to a predetermined return value at a stretch (a Step S405). The return value is set, for example, at 65 pulses which are higher than the ordinary upper limit value (60 pulses) of the superheat control aforementioned. The reason is that if the upper limit value under the superheat control is set as the return value, the refrigerant flow rate to refrigerating evaporator 5 is rather insufficient, and thus refrigerating evaporator 5 cannot be cooled rapidly.

Regulating valve 12 is raised to the return value at a stretch like this, and thus the refrigerant is supplied to refrigerating evaporator 5 at a stretch, so that refrigerating evaporator 5 is cooled in a short time and the temperature difference between the exit and the entrance of refrigerating evaporator 5, that is, the superheat amount is lowered suddenly.

Then, it is judged whether or not this is a first time for the present return control (a Step S406). In this case, when this is the first time for the return control (YES at Step S406), the process is returned to Step S401 without doing anything. The reason is that when the refrigerant is supplied at a stretch to refrigerating evaporator 5 having an insufficient refrigerant flow rate, the behavior of the refrigerant is not stable, so that the valve opening is closed fully next, and this control is stopped until regulating valve 12 is raised to the return value at a stretch by this control (refer to FIG. 25).

And, when a second return control is executed (NO at Step S406), from the exit and the entrance temperature data of refrigerating evaporator 5 read at Step S402, a superheat amount is obtained from the temperature difference (the exit temperature—the entrance temperature), and also a difference ΔT between the superheat amount and a superheat target temperature (set at 4° C. in this embodiment) is obtained (a Step S407). And, it is judged whether difference ΔT is positive or negative during the returning (a Step S408). At this time, when difference ΔT becomes negative (NO at Step S408), it is judged that the refrigerant flow rate to refrigerating evaporator 5 is too high and 1 is subtracted from the return value (a Step S409, in an example shown in FIG. 25, from 65 pulses to 64 pulses). By doing this, when the regulating valve 12 next rises up to the return value, the refrigerant supply amount to freezing evaporator 4 is reduced, so that the superheat amount of refrigerating evaporator 5 can be controlled appropriately. Further, when difference AT becomes positive (YES at Step S408), it is judged that the refrigerant flow rate is insufficient and 1 is added to the return value (a Step S410, in an example shown in FIG. 25, from 64 pulses to 65 pulses). By doing this, when regulating valve 12 next rises up to the return value by this control, the refrigerant supply amount to freezing evaporator 4 is increased, so that the superheat amount of refrigerating evaporator 5 can be controlled appropriately.

Further, as a result of the execution of this control, even if a fault is caused that the valve opening of regulating valve 12 is clogged with foreign substances, and thus the refrigerant flow rate is reduced, the valve opening of regulating valve 12 is opened at a stretch, and thus the foreign substances can be pushed out, and the refrigerant can flow smoothly.

(Return Control 2)

Next, a return control 2 according to the another embodiment of the present invention will be explained.

It is detected and responded by the return control 1 aforementioned that refrigerating side valve opening 42 of regulating valve 12 is closed fully and the refrigerant supply amount is lowered extremely, though when the rise degree of the exit temperature of refrigerating evaporator 5 is small, the return control 1 cannot be executed, and thus the control by the ordinary superheat control is executed and therefore the refrigerant supply to refrigerating evaporator 5 is delayed.

Figure 26:
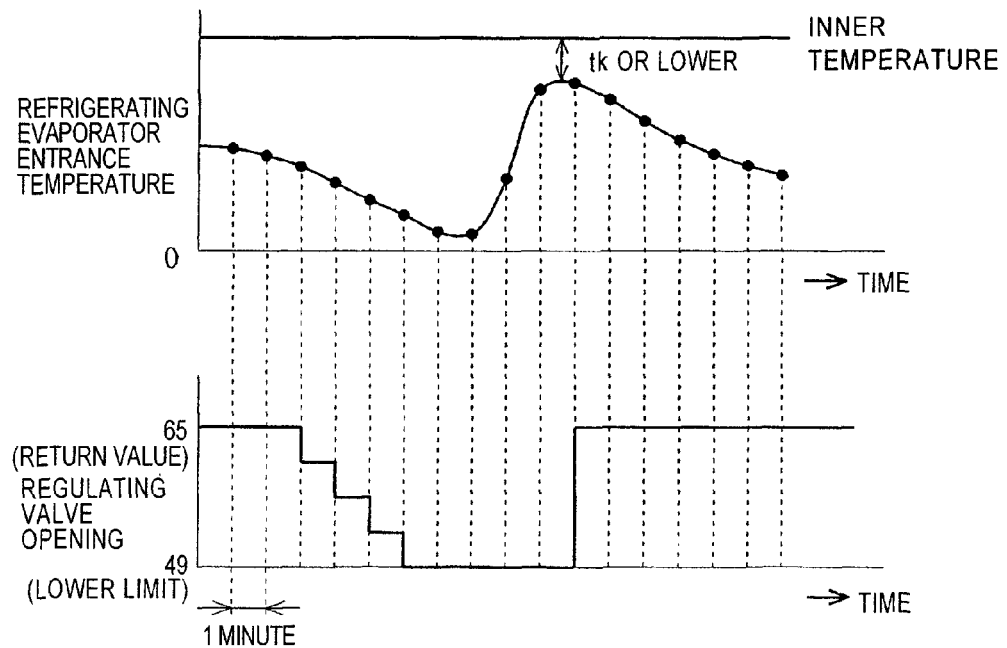
FIG. 26 is a drawing showing a relationship between an opening of the regulating valve and an exit temperature of the refrigerating evaporator under a different return control.

Therefore, controller 22, when the refrigerant supply to refrigerating evaporator 5 is lowered extremely, and the entrance temperature thereof rises and approaches the temperature of the refrigerating chamber, and a temperature difference between them, as shown in FIG. 26, reaches a predetermined value tk, for example, 5° C. or lower, judges that the refrigerant supply amount to refrigerating evaporator 5 is lowered extremely and similarly to the return control 1 aforementioned, raises the opening of regulating valve 12 at a stretch.

By the aforementioned operation, even if it cannot be detected by the return control 1 that the refrigerant supply amount to refrigerating evaporator 5 is lowered extremely, the refrigerant is supplied to refrigerating evaporator 5 at a stretch by return control 2, and thereby a delay of the refrigerant supply can be prevented.

Further, controller 22 may execute the return control when refrigerating side valve opening 42 of regulating valve 12 is fully closed. In this case, the return control can be executed without using the temperature sensor, so that the return control can be executed easily, though it should be noted that the perfect stop of the flow-in of the refrigerant into refrigerating evaporator 5 is not guaranteed.

(Return Value Changing Control)

Next, a return value changing control according to the another embodiment of the present invention will be explained.

In this return control, similarly to the superheat control aforementioned, when the number of revolutions of compressor 9 is large, the return value of, for example, 65 pulses is changed to a higher value of 70 pulses, and when the room temperature is low, the changing of the return value is not executed, and thus the pressure loss when the number of revolutions of compressor 9 is large is prevented, and a fault of excessive supply of refrigerant to refrigerating evaporator 5 when the room temperature is low can be prevented.

(Temperature Sensor Calibration Control 1)

Next, a temperature sensor calibration control 1 according to the another embodiment of the present invention will be explained.

In this embodiment, it is a basic to obtain the superheat amount of refrigerating evaporator 5 by the temperature difference detected by temperature sensors 26 and 27 installed at the exit and the entrance of refrigerating evaporator 5 and to control the refrigerant flow rate to refrigerating evaporator 5, so that when detection errors by temperature sensors 26 and 27 are great, the control of the refrigerant flow rate is unreliable. For example, when the accuracy of each of temperature sensors 26 and 27 is ±1 k, an error of the temperature difference obtained from the detected temperatures by two temperature sensors 26 and 27 is ±2 k at maximum.

On the other hand, the data required by this embodiment is a temperature difference itself between the exit and the entrance of refrigerating evaporator 5, and perceiving that the data is not the absolute values thereof, in a non-cooling state before starting the refrigerator, the difference between the detected temperatures by two temperature sensors 26 and 27 is calibrated to 0, thus the accuracy of temperature difference during the actual operation is enhanced.

Such calibration of the temperature sensors may be performed in a process of the manufacturing line, or may be performed in an initial state when the refrigerator is installed. It is important to execute the calibration when the refrigerator is not operated for many hours and two temperature sensors 26 and 27 can be considered to be at the same temperature.

(Temperature Sensor Calibration Control 2)

Next, a temperature sensor calibration control 2 according to the another embodiment of the present invention will be explained.

Evaporators 4 and 5 of the refrigerator are at sub-zero temperature during the cooling operation, and the moistures in the refrigerator are frosted and adhered to the evaporators, so that a defrosting operation for removing the frosts adhered to the evaporators 4 and 5 is performed.

Figure 27:
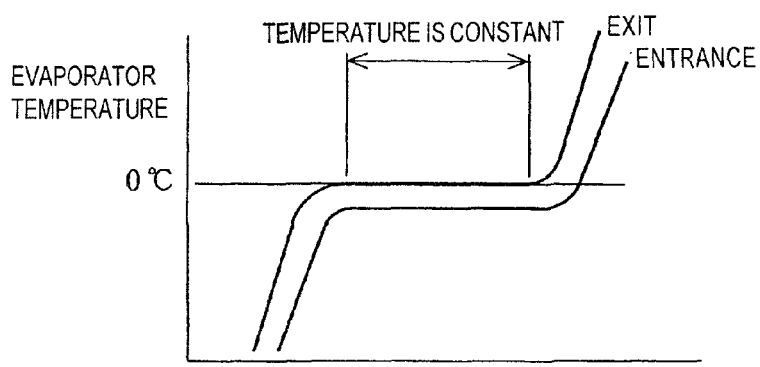
FIG. 27 is a drawing showing changes in exit and entrance temperatures of the evaporator at time of defrosting in the another embodiment of the present invention.

FIG. 27 shows an entrance temperature and an exit temperature of evaporators 4 and 5 during the general defrosting operation. As shown in FIG. 27, when the defrosting operation is started and defrosting heaters 20 and 21 are supplied with power, the evaporators are heated from the sub-zero temperature during the defrosting operation and rise in temperature, and the frost starts melting at 0° C. Here, during thawing the frosts adhered to evaporators 4 and 5, the state of 0° C. is continued, and when the major parts of the frosts are melted, the temperature rises again. In this case, the duration time of 0° C. varies with the heating capacity and the amount of the frost. At this time, temperature sensors 25 and 26 attached to the exit pipes of evaporators 4 and 5 are kept at 0° C. for specified periods of times, respectively. Therefore, the temperatures when the temperatures from temperature sensors 25 and 26 attached to evaporators 4 and 5 are continued to be constant during the defrosting operation are regarded as 0° C., and the detected temperatures of temperature sensors 25 and 26 are calibrated, and thus the detection accuracy of temperature sensors 25 and 26 can be enhanced.

Further, as a result that the detection accuracy of exit temperature sensor 26 of refrigerating evaporator 5 can be enhanced as mentioned above, by using temperature sensor calibration control 1 aforementioned, the detection accuracy of entrance temperature sensor 27 of refrigerating evaporator 5, furthermore, the detection accuracy of the superheat amount which is the detected temperature difference of two temperature sensors 26 and 27 can be enhanced.

(Refrigerant Leakage Detection Control)

Next, a refrigerant leakage detection control according to the another embodiment of the present invention will be explained.

When refrigerating side valve opening 42 of regulating valve 12 is closed, the refrigerant originally does not flow into refrigerating evaporator 5, so that the temperature of refrigerating evaporator 5 including the entrance and the exit thereof rises so as to approach an inner temperature of the refrigerating chamber. On the other hand, when a minute flow rate of the refrigerant flows into the entrance of refrigerating evaporator 5, the entrance temperature of refrigerating evaporator 5 lowers. Therefore, by detecting the entrance temperature of refrigerating evaporator 5 when valve openings 41 and 42 of regulating valve 12 are closed fully, it can be detected that the refrigerant leaks from valve openings 41 and 42 of regulating valve 12. In this case, the refrigerant flow rate from valve openings 41 and 42 of regulating valve 12 is extremely low, so that it is difficult to detect the influence thereof at the exit of refrigerating evaporator 5.

When the refrigerant leakage occurs at valve openings 41 and 42 of regulating valve 12, as a cause thereof, a case that there are cracks in valve body 43 or valve seat 39 and the refrigerant leaks due to the cracks or a case that small foreign substances are held between valve body 43 and valve seat 39, and thus the valve openings cannot be closed fully may be considered. When the leakage is caused by these foreign substances, when the refrigerant leakage is detected, valve body 43 is moved so as to remove the foreign substances, and thus the refrigerant leakage can be canceled.

Further, when the stepping motor under the open loop control is used to rotate valve body 43 as in this embodiment, even if the valve is shifted due to, for example, foreign substances, valve body 43 can be surely positioned at the initial location.

(Freezing Evaporator Cooling Priority Control)

Next, a freezing evaporator cooling priority control according to the another embodiment of the present invention will be explained.

In this freezing cycle including two evaporators connected in parallel, when the refrigerant in one evaporator is sufficient, the refrigerant of the other evaporator may insufficient rather. Therefore, the refrigerant flow rate to the evaporator having a sufficient refrigerant flow rate is controlled, and thus the other refrigerant flow rate can be prevented from being insufficient, so that the refrigerant can flow easily to one evaporator and the refrigerant flow rate is adjusted at the entrance thereof, and thus the refrigerant flow rate to the other evaporator can be adjusted.

In this embodiment, the resistance of the refrigerant flow path to refrigerating evaporator 5 is reduced, and it is set that the refrigerant flows into refrigerating evaporator 5 easier than freezing evaporator 4, and the refrigerant flow path to refrigerating evaporator 5 is controlled, and thus the refrigerant flow rate to refrigerating evaporator 5 is limited and adjusted, and the refrigerant supply to freezing evaporator 4 is realized simultaneously. Here, the refrigerant flow rates are decided by the flow path resistances of capillary tubes 15 and 16 and pressure differences between the high-pressure sides and the evaporators, respectively, so that to reduce the refrigerant flow rate to freezing evaporator 4 having a large pressure difference, the flow path resistance is decided by taking into account the pressure difference. For example, when isobutene (R600$a$) is used as a refrigerant, when the condensation temperature of condenser 11 is set at 5° C., a pressure becomes 0.46 MPa (high pressure side), and when the evaporation temperature of refrigerating evaporator 5 is set at −5° C., the pressure becomes 0.13 MPa (medium pressure side), and when the evaporation temperature of freezing evaporator 4 is set at −25° C., a pressure becomes 0.06 MPa (low pressure side), so that the pressure difference between the high pressure side and the medium pressure side becomes 0.33 MPa and the pressure difference between the high pressure side and the low pressure side becomes 0.40 MPa, and thus the refrigerant flows easily into freezing evaporator 4 having a large pressure difference, so that by releasing refrigerating side capillary tube 16, the refrigerant can flow easily into refrigerating evaporator 5.

On the other hand, in the refrigerator, to remove the frost attached to the evaporator at a fixed time interval, the defrosting operation of supplying power to the heater and melting the frost is executed, and the temperature of the evaporator at that time is positive naturally. In this case, both freezing evaporator 4 and refrigerating evaporator 5 are at positive temperatures. In this case, when the temperature of the evaporators becomes, for example, 10° C., the pressure of the evaporators becomes 0.22 MPa, so that the pressure difference between the high pressure side and freezing evaporator 4 and the pressure difference between the high pressure side and refrigerating evaporator 5 are lower than those under the ordinary control.

Figure 28:
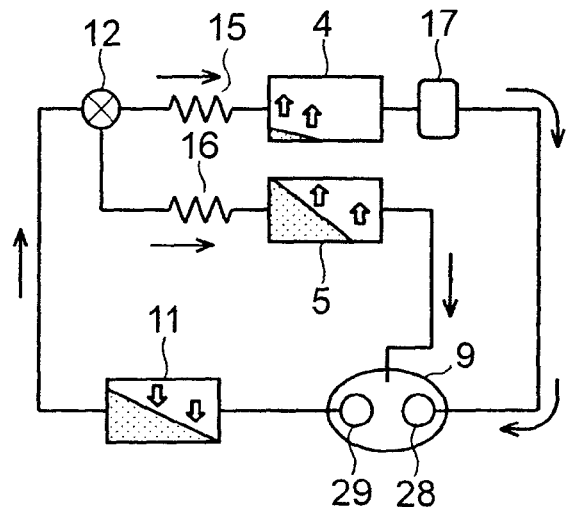
FIG. 28 is a schematic view showing a flow of the refrigerant in the freezing cycle after the defrosting operation in the another embodiment of the present invention.

In this state, the pressure differences between the high pressure side and the evaporators are similar in freezing evaporator 4 and refrigerating evaporator 5, so that the refrigerant flows easily into refrigerating evaporator 5 having a smaller flow rate resistance of refrigerating side capillary tube 16, and as shown in FIG. 28, the refrigerant flows hardly into freezing evaporator 4.

Figure 29:
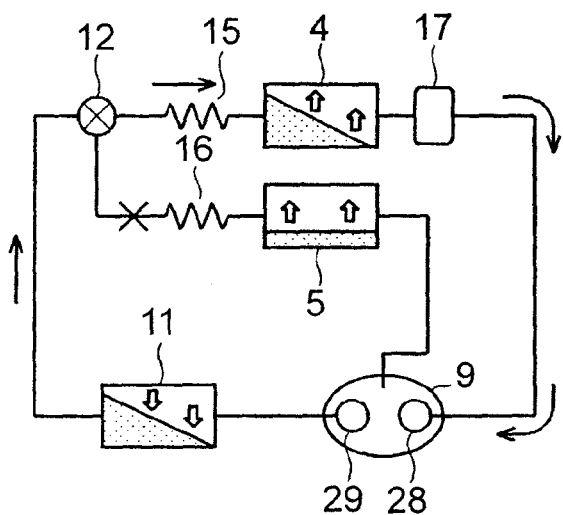
FIG. 29 is a schematic view showing a flow of the refrigerant in the freezing cycle under a priority cooling control for the freezing evaporator in the another embodiment of the present invention.

Therefore, for a first given period of time after the defrosting operation, the refrigerant flows only into freezing evaporator 4, as shown in FIG. 29, and when the temperature and pressure of freezing evaporator 4 are lowered, the refrigerant flows also into refrigerating evaporator 5, and thus the refrigerant can flow into both freezing evaporator 4 and refrigerating evaporator 5. In this case, compressor 9 is driven in the state that refrigerating side valve opening 42 of regulating valve 12 is closed fully, so that when the refrigerant stays in refrigerating evaporator 5, the staying refrigerant can be collected in compressor 9.

Here, to return the temperature and the pressure of freezing evaporator 4 to the states equivalent to those under the ordinary control, for a given period of time, for example, for 5 minutes, the operation of cold air circulating fan 6 for freezing section 2 is stopped, and the heat exchange between freezing evaporator 4 and the air in the refrigerator is not executed, and thus the temperature of freezing evaporator 4 can be lowered in a short time.

Further, when this control is executed, the air in the neighborhood of freezing evaporator 4 rising in temperature after defrosting is not sent into freezing section 2, and the temperature in freezing section 2 can be prevented from rising.

In place of the execution of this control under a time control, it is possible to detect the temperature of freezing evaporator 4 by exit temperature sensor 25 for a defrosting end detection attached to freezing evaporator 4, to detect that freezing evaporator 4 lowers to a fixed temperature, to end the operation of cold air circulating fan 6 for freezing section 2, and to make the refrigerant flow into refrigerating evaporator 5.

Meanwhile, after ending the defrosting operation, the inner temperatures become higher than usual due to non-cooling during defrosting operation and heating by defrosting heaters 20 and 21, and it is necessary to promptly cool to preserve foods. Particularly, it is necessary to cool freezing section 2 for preserving foods at low temperature in priority. Therefore, when making a refrigerant flow into refrigerating evaporator 5 after ending of cooling only freezing section 2, a target superheat amount for controlling the flow of refrigerant to refrigerating evaporator 5 is set to a larger value than that under the ordinary control. Namely, refrigerating evaporator 5 is limited strongly so as to make the refrigerant flow into refrigerating evaporator 5 hard, and to make the refrigerant flow into freezing evaporator 4 in order to realize a quick cooling. This control is executed for a given period of time or until the temperature of freezing section 2 reaches a fixed temperature, for example, −10° C.

(Refrigerant Collection Control 1)

Next, a refrigerant collection control 1 according to the another embodiment of the present invention will be explained.

When depending on the operation state of freezing cycle device 9, for example, the temperature of freezing evaporator 4 lowers than usual or the temperature of refrigerating evaporator 5 rises, the pressure difference between the high pressure side and freezing evaporator 4 is higher than the pressure difference between the high pressure side and refrigerating evaporator 5, so that the refrigerant hardly flows into refrigerating evaporator 5, while it easily flows into freezing evaporator 4. Therefore, an excessive refrigerant is collected in freezing evaporator 4 or accumulator 17 following it, and there is a fear that the limiting adjustment of the refrigerant on the basis of the superheat amount of refrigerating evaporator 5 may be difficult.

Figure 30:
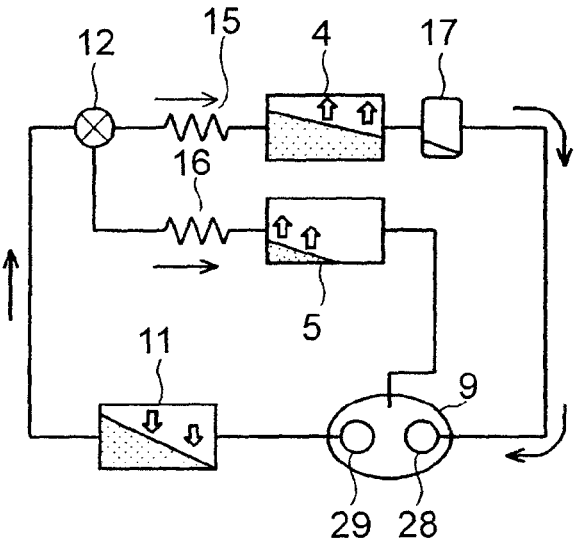
FIG. 30 is a schematic view showing a flow of the refrigerant in the freezing cycle when the refrigerant flow rate to the freezing evaporator is reduced in the another embodiment of the present invention.
Figure 31:
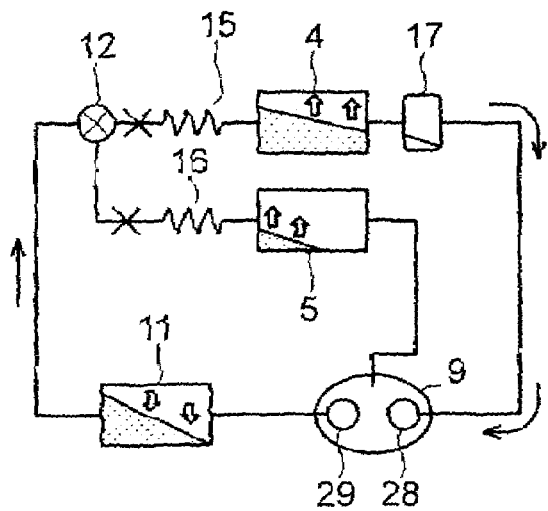
FIG. 31 is a schematic view showing a flow of the refrigerant in the freezing cycle under a refrigerant collection control in the another embodiment of the present invention.

In such a state, as shown in FIG. 30, the refrigerant flows little into refrigerating evaporator 5, so that the refrigerant is perfectly evaporated at the exit of refrigerating evaporator 5, and the temperature at the exit becomes high excessively compared with that at the entrance, and thus such a state can be detected on the basis of the superheat amount. Further, at this time, the temperature of freezing evaporator 4, as described previously, is lower than usual, so that it can be also set as a detection condition. After the detection of such a state, after a given period of time, for example, 5 minutes, regulating valve 12 is closed fully as shown in FIG. 31 (both freezing side valve opening 41 and refrigerating side valve opening 42 are closed fully), and thus after the refrigerant is collected in compressor 9 on the high pressure side, by returning to the ordinary control, the refrigerant can flow into freezing evaporator 4 and refrigerating evaporator 5.

(Refrigerant Collection Control 2)

Next, a refrigerant collection control 2 according to the another embodiment of the present invention will be explained.

Figure 32:
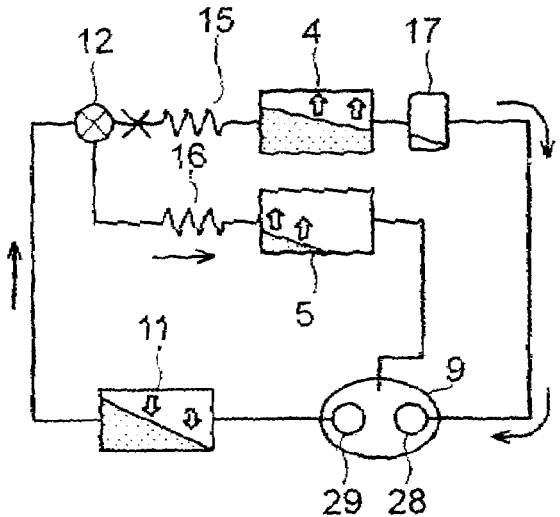
FIG. 32 is a schematic view showing a flow of the refrigerant in the freezing cycle under a different refrigerant collection control in the another embodiment of the present invention.

As shown in FIG. 32, even if only freezing side valve opening 41 to freezing evaporator 4 is closed fully, the refrigerant in freezing evaporator 4 or accumulator 17 following it is sucked into the low pressure stage of compressor 9 and can be collected. In this case, the refrigerant is distributed on the high pressure side and the medium pressure side of refrigerating evaporator 5, so that the refrigerant flowing into refrigerating evaporator 5 is supposed to be excessive. Therefore, when it is detected that a sufficient refrigerant flows into refrigerating evaporator 5, concretely, when the superheat amount which is the detected temperature difference of temperature sensors 26 and 27 installed at the exit and the entrance of refrigerating evaporator 5 is reduced, it is judged that the refrigerant flows sufficiently, and then it is desirable to end this operation mode.

Here, the refrigerant is collected from freezing evaporator 4 or accumulator 17, so that the refrigerant in freezing evaporator 4 or accumulator 17 is evaporated and collected. At this time, by operating cold air circulating fan 6 for freezing section 2, the collection of the refrigerant can be promoted.

Further, the reason that the refrigerant stays in freezing evaporator 4 or accumulator 17 is that the pressure and the temperature of the low pressure section on the side of freezing section 2 are low, so that the end of the collection of the refrigerant is detected from the temperature of the cycle on the side of freezing section 2. Namely, when there is a sufficient refrigerant, if the entrance is closed fully and the refrigerant is collected, the refrigerant during the freezing cycle evaporates and lowers in temperature. When the refrigerant is continued to be collected furthermore, the refrigerant to evaporate is reduced, and the temperature is changed so as to rise. It is possible to measure this temperature change by exit temperature sensor 25 for detecting the end of defrosting operation and to detect that the temperature rises over a predetermined temperature or it is changed so as to rise from the reducing and to end the refrigerant collection. At this time, similarly to after the aforementioned defrosting operation, it is effective for the promotion to simultaneously operate cold air circulating fan 6 for freezing section 2.

According to such the embodiment, when the power source for the refrigerator is turned on, since the detected temperatures by entrance temperature sensor 27 and exit temperature sensor 26 for detecting the superheat amount of refrigerating evaporator 5 are the same, controller 22 executes the temperature sensor calibration control for calibrating the detected temperatures of temperature sensors 26 and 27 so as to be the same on the basis of it, so that compared with the case that the detected temperatures by temperature sensors 26 and 27 are used straight for the superheat control, the superheat control can be executed surely.

In this case, controller 22 executes the superheat control on the basis of the difference between the exit temperature and the entrance temperature of refrigerating evaporator 5, so that by execution of the temperature sensor calibration control, regardless of the absolute accuracy of the detected temperatures of temperature sensors 26 and 27, it can execute surely the superheat control.

Further, when the exit temperature of refrigerating evaporator 5 is continued to be fixed during the defrosting operation, the detected temperature of exit temperature sensor 26 is calibrated to be 0° C., so that the detection accuracy of the temperature at the end of the subsequent defrosting operation can be enhanced.

According to such the embodiment, controller 22, when judging that the refrigerant supply to refrigerating evaporator 5 is stopped, controls the refrigerant flow ratio to refrigerating evaporator 5 at regulating valve 12 to be a predetermined return value, and thereby executes the return control for increasing the refrigerant amount to refrigerating evaporator 5 at a stretch, so that as compared with the case of slowly increasing the refrigerant flow rate to refrigerating evaporator 5 under the ordinary superheat control, it supplies a sufficient amount of refrigerant to refrigerating evaporator 5 at a stretch, and thereby can cool it quickly.

In this case, when the exit temperature of refrigerating evaporator 5 rises suddenly or the entrance temperature of refrigerating evaporator 5, at the state that it is close to the exit temperature, approaches the temperature of the refrigerator, it is judged that the refrigerant supply to refrigerating evaporator 5 is stopped, and thereby it can be detected surely that the refrigerant supply to refrigerating evaporator 5 is stopped.

Further, when the refrigerant flow ratio to refrigerating evaporator 5 is controlled to the predetermined return value, it is judged whether the supply amount of refrigerant to refrigerating evaporator 5 is large or small on the basis of the superheat amount of refrigerating evaporator 5, and the next return value is changed on the basis of it, so that as compared with the constitution that the return value is fixed always, the return control can be executed more appropriately.

Furthermore, even if there is the situation that the refrigerant is limited and adjusted at the valve opening of regulating valve 12, and thus the pressure loss is increased, when the number of revolutions of compressor 9 is large, the upper limit value of the refrigerant flow ratio to refrigerating evaporator 5 is increased, so that the pressure loss is reduced and a lowering in the cooling efficiency of freezing cycle device 10 can be prevented.

Moreover, when the temperature of the room where the refrigerator is installed is low, the upper limit value of the refrigerant flow ratio to refrigerating evaporator 5 is not increased, so that even if the load of freezing cycle device 10 is reduced, the refrigerant supply amount to refrigerating evaporator 5 can be prevented from being excessive.

The present invention is not limited to the embodiments aforementioned and can be modified or expanded as described below.

Figure 33:
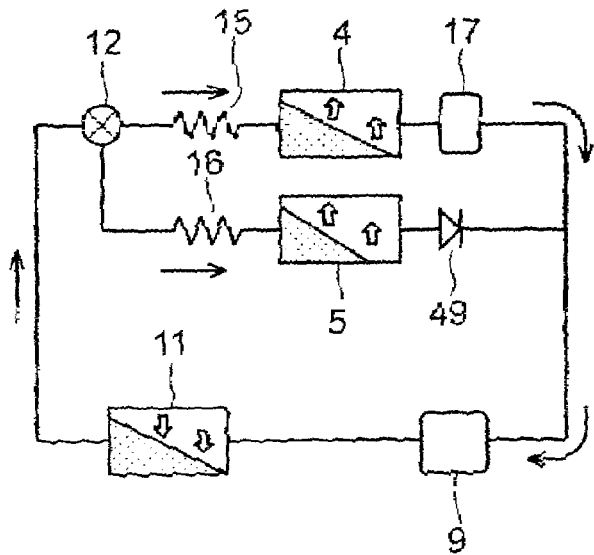
FIG. 33 is a schematic view showing a flow of the refrigerant in the freezing cycle in a modification of the present invention.

As a compressor, in place of the two-stage compressor, a single-stage compressor may be used. In this case, as shown in FIG. 33, it is necessary to install a check valve 49 on the exit side of refrigerating evaporator 5, to provide a pressure difference between the suction side of compressor 9 on the low pressure side and check valve 49, and to set the evaporation temperature of refrigerating evaporator 5 higher than the evaporation temperature of freezing evaporator 4.

Figure 34:
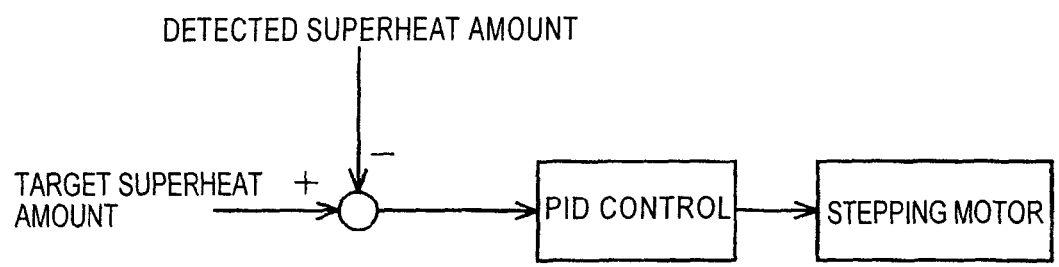
FIG. 34 is a drawing showing a PID control in a modification of the present invention.

In the respective embodiments aforementioned, controller 22 calculates the difference between the target superheat amount and the actual detected superheat amount of refrigerating evaporator 5, and controls the rotational position of valve body 43 of regulating valve 12 on the basis of the difference. However, in place of it, by a PID control as shown in FIG. 34, the opening of the valve body may be controlled. In this case, with a simple circuit constitution, the superheat amount can be controlled to the target superheat amount effectively and in a short time.

In place of limiting and adjusting the refrigerant to refrigerating evaporator 5, the refrigerant to freezing evaporator 4 may be limited and adjusted, and in this case, it is necessary to install an accumulator for storing a refrigerant flowing out from freezing evaporator 4.

Regulating valve 12 may be structured so that refrigerating side valve opening 42 is positioned lower than freezing side valve opening 41 in the state that regulating valve 12 is attached horizontally to the refrigerator.

The present invention may be applied to a freezing cycle using a combustible refrigerant, for example, isobutene as a refrigerant. In this case, the refrigerant flow rates of two evaporators 4 and 5 are controlled, and thus it can be prevented that a refrigerant is one-sided on one evaporator and the refrigerant flow rate necessary for the freezing cycle increases, so that even if the present invention is applied to a freezing cycle using a combustible refrigerant, the necessary combustible refrigerant flow rate can be minimized.

This application is based upon and claims the benefit of priority from the prior Japanese Patent Application No. 2003-400681, filed on Nov. 28, 2003; the prior Japanese Patent Application No. 2004-21559, filed on Jan. 29, 2004; and the prior Japanese Patent Application No. 2004-21560, filed on Jan. 29, 2004; the entire contents of which are incorporated herein by reference.

Obviously, numerous modifications and variations of the present invention are possible in light of the above teachings. It is therefore to be understood that within the scope of the appended Claims, the invention may be practiced otherwise than as specifically described herein.

INDUSTRIAL APPLICABILITY

The present invention is suitable for a household refrigerator or a business refrigerator.

The invention claimed is:

1. A refrigerator having a freezing cycle, wherein:
a high-pressure side discharge port of a two-stage compressor and a condenser are connected;
said condenser and flow rate variable means of a cross valve type are connected;
a refrigerating side exit of said flow rate variable means is connected to a medium pressure side suction port of said two-stage compressor via a refrigerating capillary tube and an evaporator for a refrigerating chamber;
a freezing side exit of said flow rate variable means is connected to an evaporator for a freezing chamber via a freezing capillary tube; and
said evaporator for said freezing chamber is connected to a low-pressure side suction port of said two-stage compressor via a low-pressure suction pipe;
characterized in that said refrigerator further comprises control means, which:
switches a simultaneous cooling mode for simultaneously supplying a refrigerant to said evaporator for said refrigerating chamber and said evaporator for said freezing chamber and a freezing mode for supplying said refrigerant only to said evaporator for said freezing chamber to each other by said flow rate variable means; and
during said simultaneous cooling mode, adjusts a refrigerant flow rate in a direction of easy flow of said refrigerant in either of said refrigerating capillary tube and said freezing capillary tube by said flow rate variable means, and thereby performs a temperature difference control so as to make a difference between an entrance temperature of said evaporator in said direction of easy flow of said refrigerant and an exit temperature thereof equal to a preset temperature difference.

2. A refrigerator having a freezing cycle, wherein:
a high-pressure side discharge port of a two-stage compressor and a condenser are connected;
said condenser and flow rate variable means of a cross valve type are connected;
a refrigerating side exit of said flow rate variable means is connected to a medium pressure side suction port of said two-stage compressor via a refrigerating capillary tube and an evaporator for a refrigerating chamber;
a freezing side exit of said flow rate variable means is connected to an evaporator for a freezing chamber via a freezing capillary tube; and
said evaporator for said freezing chamber is connected to a low-pressure side suction port of said two-stage compressor via a low-pressure suction pipe;
characterized in that said refrigerator further comprises control means, which:
switches a simultaneous cooling mode for simultaneously supplying a refrigerant to said evaporator for said refrigerating chamber and said evaporator for said freezing chamber and a freezing mode for supplying said refrigerant only to said evaporator for said freezing chamber to each other by said flow rate variable means; and
during said simultaneous cooling mode, adjusts a refrigerant flow rate in a direction of easy flow of said refrigerant in either of said refrigerating capillary tube and said freezing capillary tube by a number of revolutions of a fan in the neighborhood of said evaporator installed in said direction of easy flow of said refrigerant, and thereby performs a temperature difference control so as to make a difference between an entrance temperature of said evaporator in said direction of easy flow of said refrigerant and an exit temperature thereof equal to a preset temperature difference.

3. A refrigerator having a freezing cycle, wherein:
a high-pressure side discharge port of a two-stage compressor and a condenser are connected;
said condenser and flow rate variable means of a cross valve type are connected;
a refrigerating side exit of said flow rate variable means is connected to a medium pressure side suction port of said two-stage compressor via a refrigerating capillary tube and an evaporator for a refrigerating chamber;
a freezing side exit of said flow rate variable means is connected to an evaporator for a freezing chamber via a freezing capillary tube; and
said evaporator for said freezing chamber is connected to a low-pressure side suction port of said two-stage compressor via a low-pressure suction pipe;
characterized in that said refrigerator further comprises control means, which:
switches a simultaneous cooling mode for simultaneously supplying a refrigerant to said evaporator for said refrigerating chamber and said evaporator for said freezing chamber and a freezing mode for supplying said refrigerant only to said evaporator for said freezing chamber to each other by said flow rate variable means; and during said simultaneous cooling mode, adjusts a refrigerant flow rate in a direction of easy flow of said refrigerant in either of said refrigerating capillary tube and said freezing capillary tube by said flow rate variable means or by a number of revolutions of a fan in the neighborhood of said evaporator installed in said direction of easy flow of said refrigerant, and thereby performs a temperature difference control so as to make a difference between an entrance temperature of said evaporator in said direction of easy flow of said refrigerant and an exit temperature thereof equal to a preset temperature difference.

4. The refrigerator according to at least one of claims 1 to 3, wherein:

said refrigerant flows in said refrigerating capillary tube easier than said freezing capillary tube.

5. The refrigerator according to at least one of claims 1 to 3, further comprising:

an accumulator installed on a downstream side of said evaporator in a direction of hard flow of said refrigerant in either of said refrigerating capillary tube and said freezing capillary tube.

6. The refrigerator according to at least one of claims 1 to 3, further comprising:

temperature sensors installed respectively at an entrance and an exit of said evaporator in said direction of easy flow of said refrigerant; and wherein said control means measures said entrance temperature and said exit temperature using said both temperature sensors.

7. The refrigerator according to at least one of claims 1 to 3, wherein:

said control means, in said freezing mode, adjusts a capacity of said two-stage compressor, and thereby controls said temperature of said evaporator for said freezing chamber.

8. The refrigerator according to at least one of claims 1 to 3, wherein:

said control means performs said temperature difference control a fixed period of time after starting said simultaneous cooling mode.

9. The refrigerator according to at least one of claims 1 to 3, wherein:

said control means, at a start time of said temperature difference control, opens fully said refrigerating side exit of said flow rate adjustment means and at an end time of said simultaneous cooling mode, closes it fully.

10. The refrigerator according to claim 2, wherein:

said control means rotates said fan at a low speed when a difference between said entrance temperature and said exit temperature is higher than a predetermined temperature difference and at a high speed when said difference is lower than said predetermined temperature difference.

11. The refrigerator according to claim 3, wherein:

said control means adjusts said number of revolutions of said fan together with said flow rate adjustment by said flow rate adjustment means.

12. The refrigerator according to claim 3, wherein:

said control means, when a flow rate of said refrigerant at said exit of said flow rate adjustment means in said direction of easy flow of said refrigerant is lower than a predetermined flow rate, makes said number of revolutions of said fan larger than a predetermined number of revolutions.

13. The refrigerator according to claim 3, wherein:

said control means, when a flow rate of said refrigerant at said exit of said flow rate adjustment means in said direction of easy flow of said refrigerant is higher than a predetermined flow rate, makes said number of revolutions of said fan smaller than a predetermined number of revolutions.

14. The refrigerator according to claim 3, wherein:

said control means, when a difference between said entrance temperature and said exit temperature is higher than a predetermined temperature difference, adjusts said flow rate by said flow rate variable means, and when said temperature difference is lower than said predetermined temperature difference, adjusts said flow rate by said fan, and thereby performs said temperature difference control.

* * * * *